United States Patent
Masuda et al.

(10) Patent No.: US 9,683,584 B2
(45) Date of Patent: Jun. 20, 2017

(54) BRAKE DEVICE FOR VEHICLE

(71) Applicants: ADVICS CO., LTD., Kariya (JP); TOYOTA JIDOSHA KABUSHIKI KAISHA, Toyota-shi (JP)

(72) Inventors: Yoshio Masuda, Kariya (JP); Hiroaki Niino, Toyota (JP); Akira Sakai, Toyota (JP); Yasuji Mizutani, Toyota (JP); Kiyoyuki Uchida, Konan (JP); Masaaki Komazawa, Miyoshi (JP); Kazutaka Noro, Kariya (JP); Yusuke Kamiya, Okazaki (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 399 days.

(21) Appl. No.: 14/403,054

(22) PCT Filed: May 30, 2013

(86) PCT No.: PCT/JP2013/065059
§ 371 (c)(1),
(2) Date: Nov. 21, 2014

(87) PCT Pub. No.: WO2013/180225
PCT Pub. Date: Dec. 5, 2013

(65) Prior Publication Data
US 2015/0107240 A1    Apr. 23, 2015

(30) Foreign Application Priority Data

May 31, 2012  (JP) .................................. 2012-123898

(51) Int. Cl.
*F15B 9/10* (2006.01)
*B60T 8/40* (2006.01)
(Continued)

(52) U.S. Cl.
CPC ................ *F15B 9/10* (2013.01); *B60T 7/042* (2013.01); *B60T 8/4077* (2013.01);
(Continued)

(58) Field of Classification Search
CPC .... B60T 8/4077; B60T 11/224; B60T 13/686; B60T 7/042; B60T 13/146; B60T 13/662;
(Continued)

(56) References Cited

U.S. PATENT DOCUMENTS

2007/0210642 A1    9/2007  Niino et al.
2011/0285199 A1*  11/2011  Ishida .................... B60T 7/042
                                                        303/3
(Continued)

FOREIGN PATENT DOCUMENTS

JP    2005-038314 A    2/2005
JP    2007-230378 A    9/2007
(Continued)

OTHER PUBLICATIONS

International Search Report (PCT/ISA/210) mailed on Aug. 20, 2013, by the Japanese Patent Office as the International Searching Authority for International Application No. PCT/JP2013/065059.

*Primary Examiner* — Thomas J Williams
*Assistant Examiner* — Mariano Sy
(74) *Attorney, Agent, or Firm* — Buchanan Ingersoll & Rodney PC

(57) ABSTRACT

The brake device for a vehicle generates two master pressures by controlling one single servo pressure to accurately control braking force. The pressure increasing characteristic is set based on the first pressure increasing characteristic obtained from the relationship between the servo pressure and the first master pressure upon increasing the servo pressure and the second pressure increasing characteristic obtained from the servo pressure and the second master (Continued)

pressure. The pressure decreasing characteristic is set based on the first pressure increasing characteristic obtained from the relationship between the servo pressure and the first master pressure upon decreasing the servo pressure and the second pressure decreasing characteristic obtained from the servo pressure and the second master pressure. Thus, the total braking force of the brake device is the sum of a braking force generated by the first master pressure and a braking force generated by the second master piston.

9 Claims, 8 Drawing Sheets

(51) Int. Cl.
| | | |
|---|---|---|
| *B60T 11/224* | (2006.01) | |
| *F15B 13/042* | (2006.01) | |
| *B60T 7/04* | (2006.01) | |
| *B60T 13/14* | (2006.01) | |
| *B60T 13/66* | (2006.01) | |
| *B60T 13/68* | (2006.01) | |

(52) U.S. Cl.
CPC ........... *B60T 11/224* (2013.01); *B60T 13/146* (2013.01); *B60T 13/662* (2013.01); *B60T 13/686* (2013.01); *F15B 13/0422* (2013.01); *F15B 2211/528* (2013.01); *F15B 2211/7051* (2013.01)

(58) Field of Classification Search
CPC ................... F15B 9/10; F15B 13/0422; F15B 2211/7051; F15B 2211/528
USPC ............................... 303/115.1, 3, 15; 60/537
See application file for complete search history.

(56) References Cited

U.S. PATENT DOCUMENTS

| | | | |
|---|---|---|---|
| 2013/0057054 A1* | 3/2013 | Ishida | B60T 7/042 303/3 |
| 2013/0127238 A1* | 5/2013 | Masuda | B60T 13/142 303/6.01 |
| 2013/0127240 A1* | 5/2013 | Noro | B60T 13/58 303/14 |
| 2013/0127241 A1* | 5/2013 | Sakata | B60T 13/58 303/14 |
| 2013/0221736 A1* | 8/2013 | Kuki | B60T 13/686 303/20 |
| 2014/0008967 A1* | 1/2014 | Takeuchi | B60T 13/161 303/155 |

FOREIGN PATENT DOCUMENTS

| | | |
|---|---|---|
| JP | 2011-156998 A | 8/2011 |
| JP | 2012-20707 A | 2/2012 |
| JP | 2012-71681 A | 4/2012 |

* cited by examiner

Cylinder Opening side ⟵⟶ Cylinder bottom surface side

BRAKE DEVICE FOR VEHICLE

TECHNICAL FIELD

This invention relates to a brake device for a vehicle which applies braking force to the vehicle by controlling a brake hydraulic pressure.

BACKGROUND ART

For example, in a Patent Document 1, a brake device for a vehicle is disclosed wherein the device is equipped with an instruction current supply device which supplies instruction electric current based on the deviation between the target hydraulic pressure and the control hydraulic pressure so that the opening degree of the control valve, which controls the brake hydraulic pressure to be increased or decreased, is adjusted. According to this conventional brake device, the instruction current is determined based on the correction value determined by the hysteresis characteristics of electric current-flow ratio in instruction current increasing direction and instruction current decreasing direction, i.e., by the characteristics that in the instruction current increasing direction and instruction decreasing direction, current flow ratios in both directions are the same, but the currents flowing therethrough are different. This can improve the responsibility in adjusting the opening degree of the control valve.

CITATION LIST

Patent Document

Patent Document 1: JP2005-38314 A

SUMMARY OF INVENTION

Technical Problems to be Solved by the Invention

It is necessary to control a servo pressure considering the hysteresis at both pressure increase side and the pressure decrease side regarding to the characteristics of the servo pressure and the master pressure when an accurate controlling of the braking force generated by the vehicle brake device is desired. Recently, a vehicle brake device which generates two master pressures by controlling one single servo pressure has been proposed. According to this brake device, it is necessary to control the servo pressure considering the characteristics for two master cylinders. Therefore, it would be difficult to adopt an existing technology to such proposed device.

Accordingly, this invention was made in consideration with the above-mentioned situation and the objective of the invention is to provide a brake device for a vehicle which can accurately control the braking force by generating two highly precise master pressures by controlling one servo pressure.

Solutions to the Problem

The brake device for a vehicle according to the invention associated with a first aspect is characterized in that the brake device includes a master cylinder, a master piston slidably and liquid-tightly disposed in the master cylinder and forming a master chamber with the master cylinder for supplying a plurality of wheel cylinders with a master pressure, a servo chamber formed between the master piston and an intermittent wall of the master cylinder, a servo pressure generating means for generating a servo pressure to be supplied to the servo chamber and biasing the master piston in forward direction for generating the master pressure in the master chamber a brake operation means operated by an operator of the vehicle, a target master pressure setting means for setting a target master pressure based on an operation amount of the brake operation means, a pressure increasing characteristic memorized based on a relationship between the servo pressure and the master pressure when the master pressure is increasing a pressure decreasing characteristic memorized based on the relationship between the servo pressure and the master pressure when the master pressure is decreasing and a target servo pressure setting means for setting a target servo pressure in response to the target master pressure by selecting the pressure increasing characteristic or the pressure decreasing characteristic depending on a state of the master pressure either in a pressure increasing state or in a pressure decreasing state. The master piston includes a second master piston forming a second master chamber in the master cylinder defined by a front bottom portion of the master cylinder and the second master piston to supply a second wheel cylinder among the plurality of wheel cylinders with a second master pressure and a first master piston forming a first master chamber in the master cylinder defined by the second master piston and the first master piston to supply a first wheel cylinder among the plurality of wheel cylinders with a first master pressure, wherein the servo chamber is formed between a rear surface of the first master piston and the intermittent wall of the master cylinder wherein the pressure increasing characteristic is set based on a first pressure increasing characteristic obtained based on a relationship between the servo pressure and the first master pressure and a second pressure increasing characteristic obtained based on a relationship between the servo pressure and the second master pressure when the servo pressure is increasing, and wherein the pressure decreasing characteristic is set based on a first pressure decreasing characteristic obtained based on the relationship between the servo pressure and the first master pressure and a second pressure decreasing characteristic obtained based on the relationship between the servo pressure and the second master pressure when the servo pressure is decreasing.

The invention according to a second aspect is characterized in that in addition to the feature of the first aspect, the pressure increasing characteristic is obtained by a mean value between the first pressure increasing characteristic and the second pressure increasing characteristic and the pressure decreasing characteristic is obtained by a mean value between the first pressure decreasing characteristic and the second pressure decreasing characteristic.

The invention according to claim 3 is characterized in that in addition to the feature of the first or the second aspect, a reference characteristic, which indicates the relationship between the servo pressure and the master pressure assuming that a hysteresis does not exist in a slidable movement of the master piston within the master cylinder, is memorized, and that the first pressure increasing characteristic, the second pressure increasing characteristic, the first pressure decreasing characteristic and the second pressure decreasing characteristic are respectively set to be deviations from the reference characteristic of the servo pressure relative to the master pressure, while the pressure increasing characteristic and the pressure decreasing characteristic are respectively set to be deviations from reference characteristic of the servo pressure relative to the master pressure.

The brake device for the vehicle according to the invention of a fourth aspect is characterized in that in addition to the feature of any of the first to third aspects, assuming that in one of the first pressure increasing characteristic and the second pressure increasing characteristic, one that includes a point at which the master pressure becomes larger than zero (0) from zero (0) with a smaller servo pressure than the servo pressure of the other of the first and the second pressure increasing characteristics is defined to be a lower side pressure increasing characteristic and the servo pressure at the point at which the master pressure becomes larger than zero (0) from zero (0) in the lower side pressure increasing characteristic is defined to be a lower side pressure increasing starting servo pressure and assuming that the other of the first and the second pressure increasing characteristics that includes a point at which the master pressure becomes larger than zero (0) from zero (0) with a larger servo pressure than the servo pressure of the lower side pressure increasing characteristic is defined to be a higher side pressure increasing characteristic and the servo pressure at the point at which the master pressure becomes larger than zero (0) from zero (0) in the higher side pressure increasing characteristic is defined to be a higher side pressure increasing starting servo pressure, the pressure increasing characteristic is set according to a predetermined pressure increasing characteristic calculation method based on both of the first and the second pressure increasing characteristics when the servo pressure in an increasing side high pressure area where the servo pressure is equal to or more than the higher side pressure increasing starting servo pressure, the master pressure, where the servo pressure obtained by the pressure increasing characteristic in the increasing side high pressure area is the higher side pressure increasing starting servo pressure, is defined to be a both side pressure increasing starting master pressure, the pressure increasing characteristic is set to be a characteristic line connecting a point that the servo pressure is the low side pressure increasing starting servo pressure and the master pressure is zero (0) and a point that the servo pressure is the high pressure increasing starting servo pressure and the master pressure is the both side pressure increasing starting master pressure when the servo pressure is in the increasing side low pressure area in which the servo pressure is less than the high pressure increasing starting servo pressure and equal to or more than the low side pressure increasing starting servo pressure and assuming that in one of the first pressure decreasing characteristic and the second pressure decreasing characteristic, one that includes a point at which the master pressure becomes larger than zero (0) from zero (0) with a smaller servo pressure than the servo pressure of the other of the first and the second pressure decreasing characteristics, is defined to be a lower side pressure decreasing characteristic and the servo pressure at the point at which the master pressure becomes larger than zero (0) from zero (0) in the lower side pressure decreasing characteristic is defined to be a lower side pressure decreasing finishing servo pressure and assuming that the pressure decreasing characteristic that includes a point at which the master pressure becomes larger than zero (0) from zero (0) with a larger servo pressure than the servo pressure of the lower side pressure decreasing characteristic is defined to be a higher side pressure decreasing characteristic and the servo pressure at the point at which the master pressure becomes larger than zero (0) from zero (0) in the higher side pressure decreasing characteristic is defined to be a higher side pressure decreasing finishing servo pressure, the pressure decreasing characteristic is set according to a predetermined pressure decreasing characteristic calculation method, based on both of the first and the second pressure decreasing characteristics when the servo pressure in a decreasing side high pressure area where the servo pressure is equal to or more than the higher side pressure decreasing finishing servo pressure, the master pressure where the servo pressure obtained by the pressure decreasing characteristic in the decreasing side high pressure area is the higher side pressure decreasing finishing servo pressure is defined to be a both side pressure decreasing finishing master pressure and the pressure decreasing characteristic is set to be a characteristic line connecting a point that the servo pressure is the low side pressure decreasing finishing servo pressure and the master pressure is zero (0) and a point that the servo pressure is the high pressure decreasing finishing servo pressure and the master pressure is the both side pressure decreasing finishing master pressure when the servo pressure is in the decreasing side low pressure area in which the servo pressure is less than the high pressure decreasing finishing servo pressure and equal to or more than the low side pressure decreasing finishing servo pressure.

The brake device according to the invention of fifth aspect is characterized in that in any of the first to fourth aspects, the pressure increasing characteristic is selected when the operation amount by the brake operation means is increasing and the pressure decreasing characteristic is selected when the operation amount by the brake operation means is decreasing.

The brake device according to the invention of sixth aspect, is characterized in that in any of the first through fourth aspects, assuming that any of the target master pressure, a target braking force, a target hydraulic pressure braking force and a target vehicle deceleration is set to be a pressure increasing/decreasing characteristics selecting index and the pressure increasing characteristic is selected when the pressure increasing/decreasing characteristics selecting index is increasing and the pressure decreasing characteristic is selected when the pressure increasing/decreasing characteristics selecting index is decreasing.

The brake device according to the invention of a seventh aspect is characterized in that in any of the first through fourth aspects, the pressure decreasing characteristic is selected when an actual servo pressure which is actually generated is judged to have exceeded the target servo pressure while the pressure increasing characteristic is being selected and the pressure increasing characteristic is selected when the actual servo pressure which is actually generated is judged to have been below the target servo pressure while the pressure decreasing characteristic is being selected.

The brake device according to the invention of an eighth aspect is characterized in that in any of the first through fourth aspects, the pressure decreasing characteristic is selected when an actual master pressure which is actually generated is judged to have exceeded the target master pressure while the pressure increasing characteristic is being selected and the pressure increasing characteristic is selected when the actual master pressure which is actually generated is judged to have been below the target master pressure while the pressure decreasing characteristic is being selected.

The brake device according to the invention of a ninth aspect is characterized in that in any of the first through fourth aspects, the pressure decreasing characteristic is selected when an actual vehicle d deceleration which is a vehicle deceleration in actual running of the vehicle is judged to have exceeded the target vehicle deceleration while the pressure increasing characteristic is being selected and the pressure increasing characteristic is selected when the actual vehicle deceleration which is the vehicle deceleration in actual running of the vehicle is judged to have been below the target vehicle deceleration while the pressure decreasing characteristic is being selected.

According to the brake device for a vehicle associated with the invention of the first aspect, the pressure increasing characteristic is set based on the first pressure increasing characteristic obtained by the relationship between the servo pressure and the first master pressure, and the second pressure increasing characteristic obtained by the relationship between the servo pressure and the second master pressure when the master pressure is increasing. Further, the pressure decreasing characteristic is set based on the first pressure decreasing characteristic obtained by the relationship between the servo pressure and the first master pressure and the second pressure decreasing characteristic obtained by the relationship between the servo pressure and the second master pressure when the master pressure is decreasing. Accordingly, the total braking force of the brake device for the vehicle is established by the sum of a braking force generated by the first master pressure and a braking force generated by the second master pressure thereby ensuring the controlling of generation of the braking force.

According to the brake device for a vehicle associated with the invention of the second aspect, the pressure increasing characteristic is defined by a mean value of the first pressure increasing characteristic and the second pressure increasing characteristic and the pressure decreasing characteristic is defined by a mean value of the first pressure decreasing characteristic and the second pressure decreasing characteristic. Accordingly, the difference in characteristic between the first master pressure and the second master pressure can be offset or compensated, thereby to enhance the accuracy of the braking force of the brake device for the vehicle.

According to the brake device for a vehicle associated with the invention of the third aspect, the first pressure increasing characteristic is easily obtained by only obtaining one reference characteristic which indicates the relationship between the servo pressure and the master pressure, assuming that no hysteresis is generated in the movement of the master piston, as the deviation from the reference characteristic in the relationship of the servo pressure relative to the master pressure. In addition, the pressure increasing and the decreasing characteristics can be easily obtained and set as a deviation from the reference characteristic in the servo pressure relative to the master pressure.

According to the brake device of the invention of the fourth aspect, the changes of increasing inclination and decreasing inclination of the master pressure in the low pressure area can be prevented and further the remaining pressure upon the pressure decreasing operation can be eliminated to accurately control the braking force of the brake device.

According to the brake device of the invention of the fifth aspect, the changeover operation between the pressure increasing and the pressure decreasing characteristics can be smoothly performed.

According to the brake device of the invention of the sixth aspect, the changeover operation between the pressure increasing and the pressure decreasing characteristics can be surely performed.

According to the brake device of the invention of the seventh aspect, the changeover operation between the pressure increasing and the pressure decreasing characteristics can be surely performed by monitoring the actual servo pressure.

According to the brake device of the invention of the eighth aspect, the changeover operation between the pressure increasing and the pressure decreasing characteristics can be surely performed by monitoring the actual master pressure.

According to the brake device of the invention of the ninth aspect, the changeover operation between the pressure increasing and the pressure decreasing characteristics can be surely performed by monitoring the actual vehicle deceleration.

BRIEF EXPLANATION OF ATTACHED DRAWINGS

EMBODIMENTS OF THE INVENTION

Explanation of Hybrid Vehicle

Figure 1:
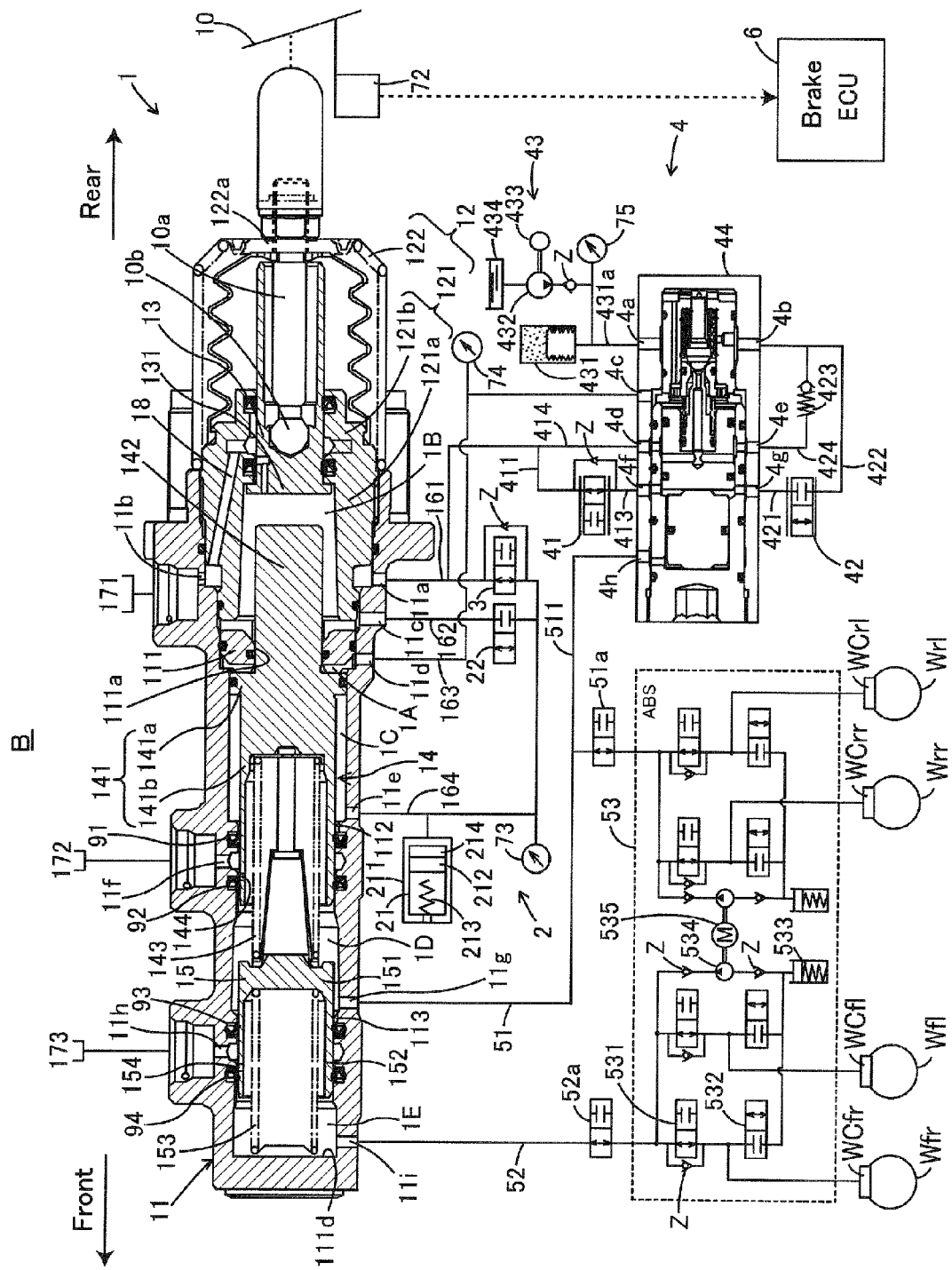
FIG. 1 is a partial sectional view of the brake device for a vehicle according to an embodiment of the invention.

The embodiment of the invention will be explained hereinafter with the attached drawings. The hybrid vehicle (hereinafter referred to simply as a vehicle), in which a friction brake device B (brake device for vehicle) is installed, is a vehicle in which a plurality of drive wheels, for example, front left and right wheels Wfl and Wfr, is driven by an engine and a motor/generator. A regeneration brake device (not shown) is formed by the motor/generator. The regeneration brake device generates regeneration braking force at the front left and right wheels Wfl and Wfr by the motor/generator.

In the vicinity of each vehicle wheel Wfl, Wfr, Wrl and Wrr, a brake disc which rotates unitary with each corresponding wheel Wfl, Wfr, Wrl and Wrr and a friction brake device which generates friction braking force by pushing a brake pad onto the brake disc are provided. Each friction brake device is equipped with each corresponding wheel cylinder WCfl, WCfr, WCrl and WCrr which pushes the brake pad onto the brake disc.

(Explanation of Brake Device for Vehicles)

The friction brake device B (brake device for a vehicle) according to this embodiment includes a master cylinder 1, a reaction force generating device 2, a separation lock valve 22, a reaction force valve 3, a servo hydraulic pressure generating device 4, ABS 53, a brake ECU 6 and various type sensors 72 through 75 which are to be in communication with the brake ECU 6.

(Explanation of Master Cylinder)

The master cylinder 1 supplies the ABS 53 with the brake fluid thereby the brake fluid supplied to the ABS is then supplied to each wheel cylinder WCfl, WCfr, WCrl and WCrr and is formed mainly by a main cylinder 11, a cover cylinder 12, an input piston 13, a first master piston 14 and a second master piston 15.

The main cylinder 11 is formed in a substantially bottomed cylinder shape having an opening at one end and a bottom surface at the other end. Hereinafter, the direction of the master cylinder is referred to as the opening side as a rear end side thereof and a bottom surface side at a front end side (closed side). The main cylinder 11 includes therein an intermediate wall 111, which divides the interior of the main cylinder 11 into two parts, an opening side (rear side) and the bottom surface side (front side). In other words, at an intermediate portion of the inner peripheral surface of the cylinder 11 in an axial line direction the intermediate wall 111 is formed extending in the axial direction over the entire periphery in a circumferential direction. The inner circumferential surface of the intermediate wall 111 is provided with a through hole 111a The main cylinder 11 includes therein a small diameter portion 112 (front) and a small diameter portion 113 (rear), at which an inner diameter of the main cylinder 11 is smaller than the rest, at locations forwardly of the intermediate wall 111. In other words, the small diameter portions 112, 113 project from the inner circumferential surface of a portion of the main cylinder 11. The master pistons 14 and 15, which will be explained later, are provided inside the main cylinder 11 and are slidably movable in the axial direction. Ports to connect inside and outside of the cylinder will be also explained later.

The cover cylinder 12 includes an approximately cylindrical portion 121 and a cup-shaped cover portion 122. The cylindrical portion 121 is arranged at a rear end of the main cylinder 11 and is coaxially fitted into the opening of the main cylinder 11. An inner diameter of a front portion 121a of the cylindrical portion 121 is formed to be greater than an inner diameter of the through hole 111a. Furthermore, the inner diameter of the rear portion 121b is formed to be greater than an inner diameter of the front portion 121a.

The cover portion 122 is assembled to the rear end portion of the main cylinder 11 and an outer peripheral surface of the cylindrical portion 121 to cover the opening of the main cylinder 11 and a rear end side opening of the cylindrical portion 121. A through hole 122a is formed at a central portion of the rear of the cover portion 122. The cover portion is made from an elastic material which is compressible in an axial direction. The bottom wall of the cover portion 122 is biased in the rear direction.

The input piston 13 is configured to slidably move inside the cover cylinder 12 in response to an operation of a brake pedal 10. The input piston 13 is slidably disposed in the cover cylinder 12 at a rear of a projection 142 of a later explained first master piston 14, separating from the projection 142. The input piston 13 formed in a substantially bottomed cylinder shape having a bottom surface at a front portion thereof and an opening at a rear portion thereof. A bottom wall 131 forming the bottom surface of the input piston 13 has a greater diameter than other parts of the input piston 13. The bottom wall 131 of the input piston 13 is arranged to be positioned at an inner rear end of the front portion 121a of the cylindrical portion 121 and the input piston 13 is slidably and fluid-tightly movable in an axial direction within the rear end portion 121b of the cylindrical portion 121.

An operating rod 10a operably connected to the brake pedal 10 is inserted into the input piston 13. A pivot 10b is provided at the tip end (front end) of the operating rod 10a so that the pivot 10b can push the input piston 13 toward front side. The rear end of the operating rod 10a projects towards the outside through the opening of the input piston 13 and the through hole 122a of the cover portion 122, and is connected to the brake pedal 10. The operating rod 10a moves in response to the operation to the brake pedal 10. More specifically, when the brake pedal 10 is depressed, the operating rod 10a advances in a forward direction while over portion 122 in the axial direction. Thus, the brake pedal 10 transmits the operation force (depression force) applied thereto from the operator of the vehicle to the input piston 13. The input piston 13 then advances in response to the forward movement of the operating rod 10a.

The first master piston 14 is arranged in the main cylinder 11 at a front portion of the input piston 13 and is slidably movable in the axial direction. In detail, the first master piston 14 includes a first pressurizing piston portion 141 and the projection 142. The first pressurizing piston portion 141 is arranged coaxially within the main cylinder 11 at a location forward of the intermediate wall 111. The first pressurizing piston portion 141 is formed in a substantially bottomed cylinder shape having an opening at a front portion thereof and a servo pressure receiving portion 141a at a rear portion thereof. In other words, the pressurizing piston portion 141 includes the servo pressure receiving portion 141a and a peripheral wall portion 141b.

The servo pressure receiving portion 141a is disposed in the main cylinder 11 and is slidably in an axial direction and fluid-tightly disposed therein. In other words, the servo pressure receiving portion 141a is provided on the entire peripheral surface of the outer periphery of the first pressurizing piston portion 141 and projecting in an outer circumferential direction. The servo pressure receiving portion 141a is positioned opposite to the front end surface of the intermediate wall 111. The peripheral wall portion 141b is formed to be of cylindrical shape, having a smaller diameter than the servo pressure receiving portion 141a and is extending from the front end surface of the servo pressure receiving portion 141a coaxially therewith in a front direction. The front portion of the peripheral wall portion 141b is disposed within the small diameter portion 112 and is slidable and liquid-tightly movable in an axial direction. The rear portion of the peripheral wall portion 141b is separated from the inner peripheral surface of the main cylinder 11.

The projection 142 is a columnar shaped portion projecting from the central portion of the rear end surface of the first pressurizing piston portion 141. The projection 142 is formed to have a smaller diameter than the first pressurizing piston portion 141 and is axially slidably disposed penetrating through a through hole 111a of the intermediate wall 111. It is noted that a seal member is provided between the outer peripheral surface of the projection 142 and the inner peripheral surface of the through hole 111a. The seal member is attached to the through hole 111a and in fluid-tight contact with the entire outer peripheral surface of the projection 142. The rear end portion of the projection 142 projects into the inner space of the cylindrical portion 121 passing through the through hole 111a. The rear end portion of the projection 142 is separated from the inner peripheral surface of the cylindrical portion 121. The rear end surface of the projection 142 is separated from the bottom wall 131 of the input piston 13 with a predetermined distance therebetween. The first master piston 14 is biased by a biasing member 143 made from spring material in a rearward direction.

It is noted here that a "servo chamber 1A" to be filled with brake fluid is defined by a rear end surface of the servo pressure receiving portion 141a of the first pressurizing piston portion 141, a front end surface of the intermediate wall 111, an inner peripheral surface of the main cylinder at the front side of the intermediate wall 111 and the outer peripheral surface of the projection 142. A separation chamber 1B to be filled with the brake fluid is defined by the rear end surface of the intermediate wall 111, an outer surface of the input piston, an inner peripheral surface of the front portion 121a of the cylindrical portion 121 and the projection 142. A reaction force chamber 1C is defined by the rear end surface (including a seal member 91) of the small diameter portion 112, an outer peripheral surface of the peripheral wall portion 141b, a front end surface of the servo pressure receiving portion 141a, the peripheral wall portion 141b and the inner peripheral surface of the main cylinder 11. In other words, a large diameter portion (a portion of the reaction force chamber 1C), which diameter is larger than the second master piston 15, is formed in the first master piston 14 between the second master piston 15 and the projection 142 and a rear side shoulder portion of the servo pressure receiving portion 141 is formed between the large diameter portion and the projection 142. Therefore, the reaction force chamber 1C is formed by a front side shoulder portion of the servo pressure receiving portion 141 formed between the large diameter portion and the first master piston 14, the outer peripheral surface of the first master piston 14 and a large diameter bore portion of the main cylinder 11 in which the large diameter portion is slidably movable.

The second master piston 15 is coaxially arranged within the main cylinder 11 at a location forward of the first master piston 14. The second master piston 15 is formed to be of a tubular shape having an opening at a front side and a bottom wall (second pressurizing piston portion 151) at a rear side. In other words, the second master piston 15 is formed by the tubular second pressurizing piston portion 151 and a peripheral wall portion 152 projecting forward from the second pressurizing piston portion 151. The second pressurizing piston portion 151 is disposed between the small diameter portions 112 and 113 at a front of the first master piston 14. The rear portion of the second master piston 15 including the second pressurizing piston portion 151 is separated from the inner peripheral surface of the main cylinder 11. The peripheral wall portion 152 is of a cylindrical shape and extends co-axially in a front direction from the outer brim of the second pressurizing piston portion 151. The peripheral wall portion 152 is axially slidably and fluid-tightly disposed in the small diameter portion 113 in an axial line direction. The second master piston 15 is biased by a biasing member 153, made from such as a coil, in a rearward direction.

A first master chamber 1D is defined by the outer side surface of the second master piston 15, the front end surface of the first master piston 14, an inner side surface of the first master piston 14, a front end surface of the small diameter portion 112 (including a seal member 92), a rear end surface of the small diameter portion 113 and an inner peripheral surface portion of the main cylinder 11 between the small diameter portions 112 and 113 (front of the intermediate wall 111). Further, a second master chamber 1E is defined by an inner bottom surface 111d of the main cylinder 11, a front end surface of the second master piston 15, an inner side surface of the second master piston 15, a front end surface of the small diameter portion 113 (including a seal member 94) and the inner peripheral surface of the main cylinder 11.

Ports 11a to 11i, which connect the inside and the outside of the master cylinder 1, are formed at the master cylinder 1. The port 11a is formed at the main cylinder 11 at a location rearward of the intermediate wall 111. The port 11b is formed at the main cylinder 11 opposite to the port 11a at approximately the same location in the axial direction. The port 11a and the port 11b are in communication through a clearance formed between the inner circumferential surface of the main cylinder 11 and the outer circumferential surface of the cylindrical portion 121. The port 11a is connected to a conduit 161. The port 11b is connected to a reservoir 171. Therefore, the port 11a is connected to the reservoir 171.

The port 11b is in communication with the separation chamber 1B via a passage 18 formed at the cylindrical portion 121 and the input piston 13. The fluid communication through the passage 18 is interrupted when the input piston 13 moves forward. In other words, when the input piston 13 moves forward, the separation chamber 1B and the reservoir 171 are disconnected from each other.

The port 11c is formed at a location forward of the port 11a and connects separation chamber 1B with a conduit 162. The port 11d is formed at a location forward of the port 11c and connects the servo chamber 1A with a conduit 163. The port 11e is formed at a location forward of the port 11d and connects the reaction force chamber 1C with a conduit 164.

The port 11f is formed between the seal members 91, 92 of the small diameter portion 112 and connects a reservoir 172 with the inside of the main cylinder 11. The port 11f is in communication with the first master chamber 1D via a passage 144 formed at the first master piston 14. The passage 144 is formed at a location slightly rearward of the seal member 92 so that the port 11f and the first master chamber 1D are disconnected from each other when the first master piston 14 moves forward.

The port 11g is formed at a location forward of the port 11f and connects the first master chamber 1D with a conduit 51. The port 11h is formed between the seal members 93, 94 of the small diameter portion 113 and connects a reservoir 173 with the inside of the main cylinder 11. The port 11g is in communication with the second master chamber 1E via a passage 154 formed at the second master piston 15. The passage 154 is formed at a location slightly rearward of the seal member 94 so that the port 11h and the second master chamber 1E are disconnected from each other when the second master piston 15 moves forward. The port 11i is formed at a location forward of the port 11h and connects the second master chamber 1E with a conduit 52.

Seal members made by, such as, an O-ring and the like (see black dots in the drawings) are appropriately provided within the master cylinder 1. The seal members 91, 92 are provided at the small diameter portion 112 and are fluid-tightly in contact with the outer circumferential surface of the first master piston 14. Similarly, the seal members 93, 94 are provided at the small diameter portion 113 and are fluid-tightly in contact with the outer circumferential surface of the second master piston 15. Additionally, seal member is provided between the input piston 13 and the cylindrical portion 121.

The stroke sensor 72, which is provided in the vicinity of brake pedal 10, detects the operation amount of brake pedal 10 (a pedal depression amount) and transmits the detection result to the brake ECU 6. Since the brake pedal 10 is connected to the rear end of the input piston 13, the stroke sensor 72 eventually detects the displacement amount in an axial direction (position in an axial line direction) relative to the input piston 13.

(Reaction Force Generating Device 2)

The reaction force generating device 2 is provided with a stroke simulator 21 and is a device for generating a reaction force against the operation force of the brake pedal 10 depressed by the operator. The stroke simulator 21 generates a reaction force hydraulic pressure in the separation chamber 1B and the reaction chamber 1C in response to the operation force of the brake pedal 10 so that a brake operation feeling (depression feeling) of a normal brake device can be reproduced. Generally, the stroke simulator 21 is configured in such a manner that a piston 212 is fitted into a cylinder 211 while being allowed to slidably move therein and a pilot hydraulic chamber 214 is formed at a location forward of the piston 212, which is biased in the forward direction by a compression spring 213. The stroke simulator 21 is connected to the reaction force chamber 1C via the conduit 164 and the port 11e, and is connected further to the separation lock valve 22 and the reaction force valve 3 via the conduit 164.

(Separation Lock Valve 22)

The separation lock valve 22 is normally closed type electromagnetic valve (linear valve) and opening and closing thereof is controlled by the brake ECU 6. The separation lock valve 22 is disposed between the conduit 164 and the conduit 162 for establishing or interrupting fluid communication therebetween. The separation lock valve 22 is a valve for establishing or interrupting the communication between the separation chamber 1B and the reaction force chamber 1C. In other words, the separation lock valve 22 opens or closes the conduits 162 and 164 which connect the separation chamber 1B and the stroke simulator 21, respectively.

The pressure sensor 73 detects mainly hydraulic pressures of the separation chamber 1B and the reaction force chamber 1C (reaction force pressure) and is connected to the conduit 164. The pressure sensor 73 detects the hydraulic pressures of the separation chamber 1B and the reaction force chamber 1C while the separation lock valve 22 is in an open state. On the other hand, while the separation lock valve 22 is in a closed state, the pressure sensor 73 detects the pressure in the reaction force chamber 1C.

(Reaction Force Valve 3)

The reaction force valve 3 is a normally-open-type electromagnetic valve and is configured so that opening and closing thereof are controlled by the brake ECU 6. The reaction force valve 3 is disposed between the conduit 164 and the conduit 161 for establishing or interrupting fluid communication therebetween. Accordingly, the reaction force valve 3 establishes communication between the separation chamber 1B and the reaction force chamber 1C and the reservoir 171.

(Control of Separation Lock Valve 22 and Reaction Force Valve 3)

Controlling of the reaction force valve 3 and the separation lock valve 22 by the brake ECU 6 under the brake operation will be explained hereinafter. When the brake pedal 10 is depressed, the input piston 13 advances to interrupt communication of the passage 18 to thereby interrupt communication between the reservoir 171 and the separation chamber 1B. At the same time, the reaction force valve 3 is closed (from open state to closed state) and accordingly, the separation lock valve 22 is opened (from closed state to open state). Due to the closing of the reaction force valve 3, the communication between the reaction force chamber 1C and the reservoir 171 is interrupted. Due to the opening of the separation lock valve 22, the communication between the separation chamber 1B and the reaction force chamber 1C is established. In other words, since the input piston 13 advances and the reaction force valve 3 is closed, the separation chamber 1B and the reaction force chamber 1C are disconnected with the reservoir 171. The amount of fluid flowing into or flowing out of the reaction force chamber 1C in response to the advancement of the master piston 14 is controlled to be the same with the fluid flowing into or out of the separation chamber 1B via the projection 142. Thus, the stroke simulator 21 generates reaction force in response to the stroke amount of the brake pedal in the separation chamber 1B and the reaction force chamber 1C. This means that the reaction force in response to the stroke amount (brake pedal 10 depression amount) of the input piston 13 is applied against to the brake pedal 10 which is connected to the input piston 13 by the stroke simulator 21.

It is noted that the area of the tip end surface of the projection 142 is the same with the area of the surface that the servo pressure receiving portion 141a faces the reaction force chamber 1C. Therefore, when the reaction force valve 3 is in a closed state and the separation lock valve 22 is in an open state, since the inner pressure in the separation chamber 1B is the same with the inner pressure in the reaction force chamber 1C, the force applied on the area of the tip end surface of the projection 142 and the force applied on the area of the surface that the servo pressure receiving portion 141a faces the reaction force chamber 1C are equal and even the operator of the vehicle depresses on the brake pedal 10 and the inner pressures of the separation chamber 1B and the reaction force chamber 1C are raised thereby, the first master piston 14 will not move. Further, since the areas of the tip end surface of the projection 142 and the surface that the servo pressure receiving portion 141a faces the reaction force chamber 1C are the same, even the first master piston 14 is moved, the fluid amount flowing into the stroke simulator 21 is not changed, the reaction force pressure in the separation chamber 1B is not changed. Thus the reaction force transmitted to the brake pedal 10 is not changed.

(Servo Pressure Generating Device 4)

The servo pressure generating device 4 mainly includes a pressure decreasing valve 41, a pressure increasing valve 42, a pressure supplying portion 43 and a regulator 44. The pressure decreasing valve 41 is a normally-open-type electromagnetic valve and the hydraulic pressure in the flow passage downstream of the pressure decreasing valve 41 is controlled by the brake ECU 6 by linearly controlling the opening area of the flow passage. One port of the pressure decreasing valve 41 is connected to the conduit 161 via a conduit 411, and the other port of the pressure decreasing valve 41 is connected to a conduit 413. More specifically, the one outlet/inlet port of the pressure decreasing valve 41 is in communication with the reservoir 171 via the conduits 411, 161, and ports 11a, 11b. The pressure increasing valve 42 is a normally-closed-type electromagnetic valve and the hydraulic pressure in the flow passage downstream side of the pressure increasing valve 42 is controlled by the brake ECU 6 by linearly controlling the opening area of the flow passage. One port of the pressure increasing valve 42 is connected to the conduit 421 and the other port of the pressure increasing valve 42 is connected to a conduit 422.

The pressure supplying portion 43 is a means for supplying a highly pressurized brake fluid to the regulator 44. The pressure supplying portion 43 mainly includes an accumulator 431, a hydraulic pressure pump 432, a motor 433 and a reservoir 434.

The accumulator 431 accumulates the hydraulic pressure generated by the hydraulic pressure pump 432. The accumulator 431 is connected to the regulator 44, pressure sensor 75 and the hydraulic pressure pump 432 via a conduit 431a. The hydraulic pressure pump 432 is connected to the motor 433 and the reservoir 434. The hydraulic pressure pump 432 supplies the accumulator 431 with the brake fluid reserved in the reservoir 434 by driving the motor 433. The pressure sensor 75 detects the pressure in the accumulator 431. The detection value of the pressure correlates to the consumption amount of the brake fluid accumulated in the accumulator 431. In addition to the correlation amount of the consumption amount of the brake fluid, the servo pressure which is an increased pressure by using the brake fluid in the accumulator 431 or the increasing reaction force pressure which increases with the increase of the servo pressure are exampled as the value detected by the pressure sensor.

When the pressure sensor 75 detects that the accumulator pressure decreases to a value equal to or lower than a predetermined value, the motor 433 is driven on the basis of a control signal from the brake ECU 6, and the hydraulic pressure pump 432 supplies the brake fluid with the accumulator 431 in order to recover a pressure energy to the value.

Figure 2:
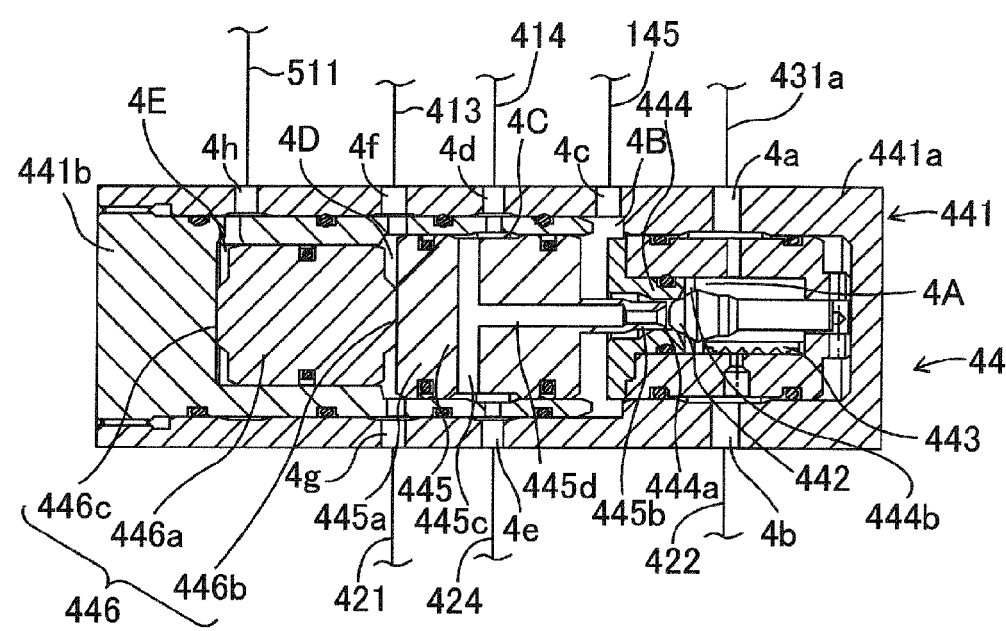
FIG. 2 is a partial cross sectional view illustrating a configuration of a regulator according to the embodiment of the invention.

The regulator 44 is a general type of the regulator but adding the sub piston 446 to such general type regulator. As shown in FIG. 2, the regulator 44 is structured mainly by a cylinder 441, a ball valve 442, a biasing portion 443, a valve seat portion 444, a control piston 445 and a sub-piston 446.

The cylinder 441 includes a cylinder case 441a formed in a substantially bottomed cylinder-shape having a bottom surface at one end thereof (at the right side in FIG. 2), and a cover member 441b closing an opening of the cylinder case 441a (at the left side thereof in FIG. 2). The cover member 441b is formed to be substantially U-shaped in cross-section in FIG. 2. However, the regulator 44 is explained here with the cover member 441b as a columnar shaped member and a portion that closes the opening of the cylinder case 441a as the cover member 441b in this embodiment. The cylinder case 441a is provided with plural ports 4a to 4h through which the inside and the outside of the cylinder case 441a are in communication.

The port 4a is connected to the conduit 431a. The port 4b is connected to the conduit 422. The port 4c is connected to the conduit 163. The port 4d is connected to the conduit 161 via the conduit 41. The port 4e is connected to a conduit 424, which is connected to the conduit 422 via a relief valve 423. The port 4f is connected to the conduit 413. The port 4g is connected to the conduit 421. The port 4h is connected to a conduit 511, which is diverged from the conduit 51.

The ball valve 442 is a valve having a ball shape at a tip end portion thereof. The ball valve 442 is provided within the cylinder 441 at a location closer to the bottom surface of the cylinder case 441a (which will be hereinafter referred to also as a cylinder bottom surface side). The biasing portion 443 is a spring member biasing the ball valve 442 towards the opening side of the cylinder case 441a (which will be hereinafter referred to also as a cylinder opening side), and is provided at the bottom surface of the cylinder case 441a. A valve seat portion 444 is a wall member provided in the inner peripheral surface of the cylinder case 441a to divide the cylinder into the cylinder opening side and the cylinder bottom surface side. A through passage 444a through which the divided cylinder opening side and the cylinder bottom surface side are in communication is formed at a center of the valve seat portion 444. At the opening of the cylinder bottom surface side of the through passage 444a, a valve seat surface 444b which is shaped as a truncated cone with which the ball valve 442 is in contact. By the contact of the biased ball valve 442 with the valve seat surface 444b, the through passage 444a is closed.

A space defined by the ball valve 442, the biasing portion 443, the valve seat portion 444, and a portion of the inner circumferential surface of the cylinder case 441a positioned closer to the cylinder base surface is referred to as a first chamber 4A. The first chamber 4A is filled with the brake fluid. The first chamber 4A is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is provided inside the cylinder 441 in a coaxial and fluid-tight manner relative to the cylinder opening side of the valve seat portion 444, while allowing the main body portion 445a to be slidably movable in the axial direction. The main body portion 445a is biased towards the cylinder opening side by means of a biasing member, which is not illustrated. A passage 445c is formed at a substantially intermediate portion of the main body portion 445a in the cylinder axial direction. The passage 445c extends in the radial direction (in an up-and-down direction in FIG. 2) so that both end portions thereof open at a circumferential surface of the main body portion 445a. A portion of an inner circumferential surface of the cylinder 441 corresponding to the location of the opening of the passage 445c is provided with the port 4d and is formed to recess so as to form a third chamber 4C together with the main body portion 445a.

The projection portion 445b projects towards the cylinder base surface from a center portion of an end surface of the main body portion 445a facing the cylinder base surface. The projection portion 445b is formed so that the diameter thereof is smaller than the diameter of the through passage 444a of the valve seat portion 444. The projection portion 445b is coaxially provided relative to the through passage 444a. An end portion of the projection portion 445b is spaced apart from the ball valve 442 towards the cylinder opening by a predetermined distance. A passage 445d is formed at the projection portion 445b so that the passage 445d extends in the cylinder axial direction and opens at a center portion of an end surface of the projection portion 445b facing the cylinder base surface. The passage 445d extends to the inside of the main body portion 445a and is connected to the passage 445c.

A space defined by the end surface of the main body portion 445a facing the cylinder bottom surface, an outer surface of the projection portion 445b, the inner circumferential surface of the cylinder 441, the valve seat portion 444, and the ball valve 442 is referred to as a second chamber 4B. The second chamber 4B is in communication with the ports 4d and 4e via the passages 445c and 445d and the third chamber 4C.

The sub piston 446 includes a sub main body portion 446a, a first projection portion 446b, and a second projection portion 446c. The sub main body portion 446a is formed in a substantially columnar shape. The sub main body portion 446a is provided within the cylinder 441 in the coaxial and fluid-tight manner relative to the cylinder opening side of the main body portion 445a while allowing the sub main body portion 446a to be slidably movable in the axial direction.

The first projection portion 446b is formed in a substantially columnar shape having a smaller diameter than the sub main body portion 446a and projects from a center portion of an end surface of the sub main body portion 446a facing the cylinder base surface. The first projection portion 446b is brought into contact with an end surface of the main body portion 445a, facing to the cylinder opening side. The second projection portion 446c is formed in the same shape as the first projection portion 446b. The second projection portion 446c projects from a center portion of an end surface of the sub main body portion 446a facing to the cylinder opening side. The second projection portion 446c is in contact with the cover member 441b.

A space defined by the end surface of the cylinder bottom surface side of the sub main body portion 446a, an outer surface of the first projection portion 446b, an end surface of the cylinder opening side of the control piston 445 and the inner circumferential surface of the cylinder 441 is referred to as a pressure control chamber 4D. The pressure control chamber 4D is in communication with the pressure decreasing valve 41 via the port 4f and the conduit 413, and with the pressure increasing valve 42 via the port 4g and the conduit 421.

A space defined by the end surface of the cylinder opening side of the sub main body portion 446a, an outer surface of the second projection portion 446c, the cover member 441b, and the inner circumferential surface of the cylinder 441 is referred to as a fourth chamber 4E. The fourth chamber 4E is in communication with the port 11g via the port 4h and the conduits 511 and 51. Each of the chambers 4A through 4E is filled with the brake fluid. The pressure sensor 74 as shown in FIG. 1 is a sensor that detects the pressure (the servo pressure) in the servo chamber 1A and is connected to the conduit 163.

(Brake Piping)

The first master chamber 1D and the second master chamber 1E which generate master cylinder pressure are in communication with the wheel cylinders WCfl, WCfr, WCrl and WCrr via the conduits 51 and 52 and the ABS 53. In more detail, the port 11g of the first master chamber 1D and the port 11i of the second master chamber 1E are connected to the well-known ABS (Anti-Lock Brake System) 53 via the conduits 51 and 52, respectively. The ABS is connected to the wheel cylinders WCfl, WCfr, WCrl and WCrr which apply braking operation on the corresponding vehicle wheels Wfl, Wfr, Wrl and Wrr.

The control of the ABS 53 will be explained here particularly to the one which is associated with the vehicle wheel Wfr. The structure explaining now is similar to the other ABS structures associated with the remaining vehicle wheels and accordingly, the explanation thereof will be omitted. The ABS 53 is structured by a holding valve 531, a pressure decreasing valve 532, a reservoir 533, a pump 534, and a motor 535. The holding valve 531 is a normally-open-type electromagnetic valve and the opening and closing operation is controlled by the brake ECU 6. The holding valve 531 is arranged so that one side is connected to the conduit 52 and the other side is connected to the wheel cylinder WCfr and the pressure decreasing valve 532. In other words, the holding valve 531 is an input valve for the ABS 53.

The pressure decreasing valve 532 is a normal close type electro-magnetic valve and the opening and closing operation is controlled by the brake ECU 6. The pressure decreasing valve 532 is connected to the wheel cylinder WCfr and the holding valve 531 at one side and at the other side is connected to the reservoir 533. When the pressure decreasing valve 532 is opened, fluid communication between the wheel cylinder WCfr and the reservoir 533 is established.

The reservoir 533 is used for reserving therein the brake fluid and is in communication with the conduit 52 via the pressure decreasing valve 532 and the pump 534. The pump 534 is connected to the reservoir 533 at the suction port and the discharge port is connected to the conduit 52 via a one-way valve "z". It is noted here that the one-way valve "z" allows the flow from the pump 534 to the conduit 52 (the second master chamber 1E), but restricts the flow in opposite direction. The pump 534 is driven by the motor 535 which is actuated by a command from the brake ECU 6. The pump 534 suctions the brake fluid stored in the reservoir 533 or in the wheel cylinder WCfr and returns the brake fluid to the second master chamber 1E under the pressure decreasing mode of the ABS control. It is noted that a damper chamber (not shown) may be provided in the upstream side of the pump 534 to dampen the pulsation of the brake fluid discharged by the pump 534.

The ABS 53 includes a vehicle wheel speed sensor (not shown) which detects the vehicle wheel speed. The detection signal indicating the vehicle wheel speed detected by a vehicle wheel speed sensor (not shown) is outputted to the brake ECU 6.

According to the ABS 53 having the above-described configuration, the brake ECU 6 controls switching over operations of the opening/closings of each of the electro-magnetic valves 531 and 532, and if necessary, operates the motor 535 to perform ABS (Anti-Lock Brake Control) control in which the brake hydraulic pressure to be applied to the wheel cylinder WCfr, i.e., braking force applied on the vehicle wheel Wfr is controlled. The ABS 53 supplies the wheel cylinders WCfl, WCfr, WCrl and WCrr with the brake fluid supplied from the master cylinder 1 based on the instructions from the brake ECU 6 by adjusting the volume and timing of supply (by adjusting the master pressure).

In the "linear mode" which will be explained later, the hydraulic pressure discharged from the accumulator 431 of the servo pressure generating device 4 is controlled by the pressure valve 42 and the pressure valve 41 to thereby generate a servo pressure in the servo pressure chamber 1A. This will cause the first and the second master pistons 14 and 15 to advance to pressurize the brake fluid in the first and the second master chambers 1D and 1E. The pressurized brake fluid in the first and the second master chambers 1D and 1E is supplied to the wheel cylinders WCfl, WCfr, WCrl and WCrr as the master cylinder pressure from the ports 11g and 11i via the conduits 51 and 52 and the ABS 53 to apply hydraulic braking force to the vehicle wheels Wfl, Wfr, Sfl and Wrr.

(Brake ECU 6)

The brake ECU 6 is an electric control unit including a microprocessor and the microprocessor includes input/output interface, CPU, RAM, ROM and non-volatile memory which are respectively connected with one another via bus communication.

The brake ECU 6 is in communication with various sensors 72 through 75 and controls each electromagnetic valve 22, 3, 41, 42, 531 and 532 and motors 433 and 535. Further, the brake ECU 6 is mutually communicable with hybrid ECU (not shown) and performs therewith a cooperative control (regeneration cooperative control) so that the required braking force is equalized with the total value of a target regeneration braking force generated by the regeneration brake device and a target friction braking force generated by the friction brake device B. The brake ECU 6 operates in two control modes, linear mode and REG mode.

The "linear mode" is a normal brake control mode as will be later explained in detail. In the "linear mode", the brake ECU 6 energizes the separation lock valve 22 to open and energizes the reaction force valve 3 to close. Under such "linear mode" state, the brake ECU 6 calculates the vehicle operator's "requested braking force" based on the operation amount (displacement amount of the input piston 13) of the brake pedal 10 which is detected by the stroke sensor 72. Then, the brake ECU 6 outputs the vehicle operator's "requested braking force" to the hybrid ECU. The hybrid ECU obtains a target value of the regeneration brake device A, i.e., "a target regeneration braking force" and calculates a "target friction braking force" by subtracting the "target regeneration braking force" from the "requested braking force". Further, the brake ECU 6 controls the pressure decreasing valve 41 and the pressure increasing valve 42 based on the calculated "target friction braking force" thereby controlling the servo pressure in the servo pressure chamber 1A. Thus, the friction braking force generated in the friction brake device B is controlled to be the target friction braking force. The requested braking force is calculated by the displacement amount of the input piston 13. However, since the target friction braking force is calculated based on the displacement amount of the input piston 13, the value is variable depending on the value of the target regeneration braking force. Accordingly, the movement of the first master piston 14 is not necessarily corresponding to the movement of the input piston 13. When the target regeneration braking force is increased, while the value of the requested braking force is unchanged, the friction braking force decreases by the increased amount of the target regeneration braking force. Therefore, the first master piston 14 approaches the input piston 13 by the distance corresponding to the decreased amount of the friction braking force.

"REG mode" is a mode that the pressure decreasing valve 41, the pressure increasing valve 42, the separation lock valve 22 and the reaction force valve 3 are controlled to be in non-excited state or a mode that the valves are forced to be in non-excited state (keeping the normal state) due to a failure or the like.

(Linear Mode)

When the brake pedal 10 is not depressed, the operation mode becomes the state described above, i.e., the state that the ball valve 442 closes the through passage 444a of the valve seat portion 444. Under this state, the pressure decreasing valve 41 is open and the pressure increasing valve 42 is closed. Therefore, the first chamber 4A and the second chamber 4B are separated from each other.

The second chamber 4B is in communication with the servo chamber 1A through the conduit 163 to keep the pressure in the chambers to be equal to each other. The second chamber 4B is in communication with the third chamber 4C via the passages 445c and 445d of the control piston 445. Accordingly, the second chamber 4B and the third chamber 4C are in communication with the reservoir 171 via the conduits 414 and 161, respectively. The pressure control chamber 4D is closed by the pressure increasing valve 42 on one hand and is open to the reservoir on the other hand through the pressure decreasing valve 41. The pressures in the pressure control chamber 4D and the second chamber 4B are kept to be equal with each other. The fourth chamber 4E is in communication with the first master chamber 1D via the conduits 511 and 51, respectively to keep the pressures in the chambers to be equal to each other.

From this state, when the brake pedal 10 is depressed, the brake ECU 6 controls the pressure decreasing valve 41 and the pressure increasing valve 42 based on the target friction braking force. In other words, the brake ECU 6 controls the pressure decreasing valve 41 to be in closing direction and controls the pressure increasing valve 42 to be in opening direction.

Upon the opening of the pressure increasing valve 42, the communication between the accumulator 431 and the pressure control chamber 4D is established. Upon the closing of the pressure decreasing valve 41, the communication between the pressure control chamber 4D and the reservoir 171 is interrupted. The hydraulic pressure in the pressure control chamber 4D can be raised by the high pressure brake fluid supplied from the accumulator 431. As the hydraulic pressure in the pressure control chamber 4D increases, the control piston 445 is slidably moved towards the cylinder bottom surface side. Then due to such movement of the control piston 445, the tip end of the projection portion 445b of the control piston 445 is brought into contact with the ball valve 442 to close the passage 445d by the ball valve 442. Thus the communication between the second chamber 4B and the reservoir 171 is interrupted.

Further slidable movement of the control piston 445 towards the cylinder bottom surface side pushes the ball valve 442 towards the cylinder bottom surface side by the projection portion 445b to separate the ball valve 442 from the valve seat portion 444. This will allow communication between the first chamber 4A and the second chamber 4B through the through passage 444a of the valve seat portion 444. A high pressure brake fluid is supplied to the first chamber 4A from the accumulator 431 and the hydraulic pressure in the second chamber 4B which is in communication with the first chamber 1A is also increased. It is noted here that larger the separation distance from the valve seat surface 444b of the ball valve 442, larger the flow passage of the brake fluid becomes thereby raising the hydraulic pressure in the area downstream of the ball valve 442. In other words, as the pressure (pilot pressure) in the pressure control chamber 4D increases, the displacement distance of the control piston 445 becomes large, and accordingly, the separation distance from the valve seat surface 444b of the ball valve 442 becomes large to thereby raise the hydraulic pressure (servo pressure) in the second chamber 4B. It is noted that the brake ECU is structured in such a manner that the pressure increasing valve 42 is controlled to have the flow passage in the downstream of the pressure increasing valve 42 become large and at the same time the pressure decreasing valve 41 is controlled to have the flow passage downstream of the pressure decreasing valve 41 become small, so that the pilot pressure in the pressure control chamber 4D becomes high when the displacement amount of the piston 13 (operation amount of the brake pedal 10) detected by the stroke sensor 72. In other words, larger the displacement of the input piston (operation amount of the brake pedal 10), higher the pilot pressure and accordingly, higher the servo pressure becomes.

Due to the increase of the pressure in the second chamber 4B, the pressure in the servo chamber 1A which is in communication with the second chamber 4B increases and the first master piston 14 advances and the pressure in the first master chamber 1D increases by the advance movement of the first master piston 14. Then the second master piston 15 also advances to increase the pressure in the second master chamber 1E. By this increase of the pressure, the high pressure brake fluid is supplied to the ABS 53, which will be later explained in detail and the fourth chamber 4E. Although the pressure in the fourth chamber 4E increases, the sub piston 446 does not move due to the increase of pressure in the pressure control chamber 4D. Thus, the high pressurized brake fluid (master cylinder pressure) is supplied to the ABS 53 to operate the friction brake device and the braking force is applied to the vehicle. In the linear mode, the force applied to the first master piston 14 to advance corresponds to the force corresponding to the servo pressure.

When the brake pedal is released, the brake ECU opens the pressure decreasing valve 41 to be open and the pressure increasing valve 42 to be closed to establish communication between the reservoir 171 and the pressure control chamber 4D. Then the control piston 445 retracts and the state returns to the state in which the brake pedal is not depressed.

(REG Mode)

In the REG (regulator) mode, the pressure decreasing valve 41, pressure increasing valve 42, separation lock valve 22 and the reaction force valve 3 are controlled not to be excited. Accordingly, the pressure decreasing valve 41 is in open state, the pressure increasing valve 42 is in closed state, the separation lock valve 22 is in closed state and the reaction force valve 3 is in open state. Such non-excited state (non-controlled state) is kept even after the brake pedal 10 is depressed In the "REG mode", when the brake pedal 10 is depressed, the input piston 13 advances to have the communication between the separation chamber 1B and the reservoir 171 through the passage 18 is interrupted. Under this state, the separation chamber 1B is fluid-tightly closed (liquid-tight) due to the closing of the separation lock valve 22. The reaction force chamber 1C is in communication with the reservoir 171 by the opening of the reaction force valve 3.

Further depression of the brake pedal 10 by the operator of the vehicle advances the input piston 13 thereby to increase the pressure in the separation chamber 1B and the first master piston 14 advances by such pressure increase. The servo hydraulic pressure is not generated at this stage due to the non-energized state of the pressure decreasing valve 41 and the pressure increasing valve 42. In other words, the first master piston 14 advances only by a force corresponding to the operation force of the brake pedal 10 (the hydraulic pressure in the separation chamber 1B). This will increase the volume of the servo chamber 1A and the brake fluid is supplemented from the reservoir 171 through the regulator 44.

When the first master piston 14 advances, as similar to the linear mode, the master cylinder hydraulic pressure in the first master chamber 1D and the second master chamber 1E increases. By this pressure increase in the first master chamber 1D, the pressure in the fourth chamber 4E increases. Thus the sub piston 446 slidably moves towards the cylinder surface side due to the increase of pressure in the fourth chamber 4E. At the same time the control piston 445 is slidably moves towards the cylinder surface side by being pushed by the first projection portion 446b. Then the projection 445b is brought into contact with the ball valve 442 and the ball valve 442 is then pushed to be moved towards the cylinder surface side. In the other words, the first and the second chambers 4A and 4B are in communication and the communication between the servo chamber 1A and the reservoir 171 is interrupted. Thus, the high pressurized brake fluid is supplied from the accumulator 431 to the servo chamber 1A.

Under this REG mode, if the brake pedal 10 is depressed to a predetermined amount, the accumulator 431 and the servo chamber 1A establish communication therebetween to raise the servo pressure without positive controlling. Then the high pressure brake fluid is supplied to the ABS 53 even under the electromagnetic valves are not excited.

Under the REG mode, the force which advances the first master piston 14 corresponds to the force which advances the first master piston 14 only by the operation force and the force which advances the first master piston 14 through the servo pressure mechanically generated based on the driving thereof.

(Master Pressure Control)

The master cylinder 1 is formed with the first and the second master chambers 1D and 1E to generate two master pressures using one servo pressure. Generally, when the master pressure is intended to be increased, a first pressure increasing characteristic is obtained by a relationship between the servo pressure and the first master pressure generated in the first master chamber 1D and when the master pressure is intended to be decreased, a first pressure decreasing characteristic is obtained by the relationship between the servo pressure and the first master pressure generated in the first master chamber 1D and a hysteresis is generated between the first pressure decreasing characteristic and the first pressure increasing characteristic derived from the sliding friction between the first master piston 14 and the main cylinder 11 upon a relative slidable movement therebetween. Similarly, when the master pressure is intended to be increased, a second pressure increasing characteristic is obtained by the relationship between the servo pressure and the second master pressure generated in the second master chamber 1E and when the master pressure is intended to be decreased, a second pressure decreasing characteristic is obtained by the relationship between the servo pressure and the second master pressure generated in the second master chamber 1E and another hysteresis is generated between the second pressure increasing characteristic and the second pressure decreasing characteristic derived from the sliding friction between the second master piston 15 and the main cylinder 11 upon a relative slidable movement therebetween.

As explained above, the hysteresis generated between the first pressure increasing characteristic and the first decreasing characteristic and the hysteresis generated between the second pressure increasing characteristic and the second decreasing characteristic are different from each other and if a target servo pressure is determined based on a target master pressure of one of the pressure increasing characteristics and the pressure increasing characteristics, a large difference may be generated between the target master pressure and the actual master pressure. This may become a cause of inaccurate hydraulic pressure braking force. Accordingly, a control obtaining an accurate hydraulic pressure braking force will be explained hereinafter with reference to FIGS. 3 and 4.

Figure 3:
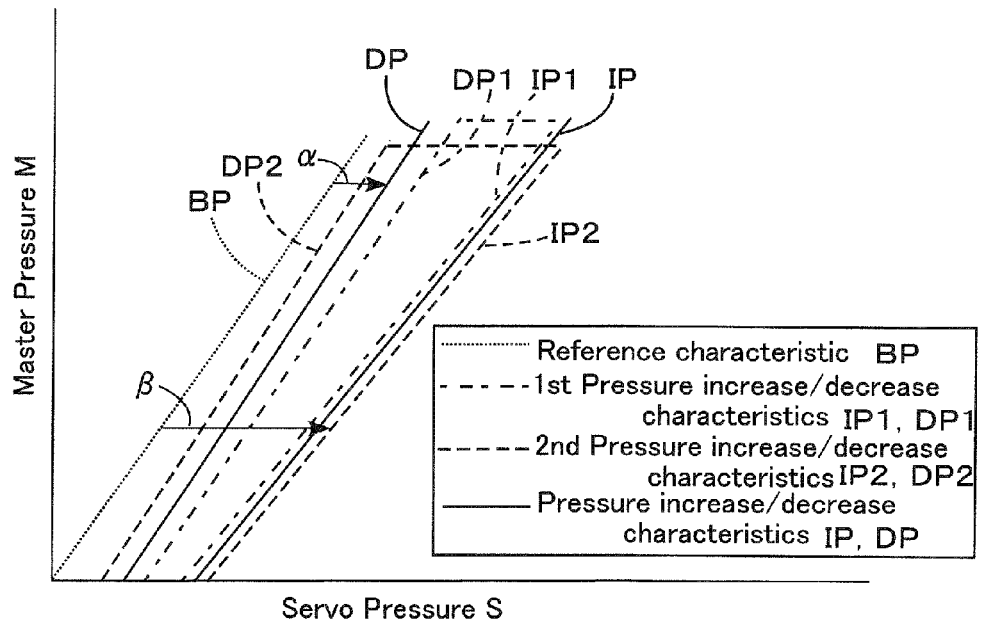
FIG. 3 is a graph illustrating a relationship between the servo pressure and the master pressure according to the embodiment of the invention.

As shown in FIG. 3, a reference characteristic BP (dotted line in FIG. 3) indicating the relationship between the servo pressure S and the master pressure M is set, assuming that a hysteresis is not generated during the sliding movement of the master pistons 14 and 15 within the main cylinder 11. The first pressure increasing characteristic IP1 (one-dot-chain line in FIG. 3), the second pressure increasing characteristic IP2 (broken line in FIG. 3), the first pressure decreasing characteristic DP1 (one-dot-chain line in FIG. 3) and the second pressure decreasing characteristic DP2 (broken line in FIG. 3) are set as deviations from the reference characteristic BP in the relationship of servo pressure S relative to the master pressure M. For example, by obtaining the eight points in which each deviation is added on two randomly selected points on the reference characteristic BP, the deviations IP1 and IP2, DP1 and DP2 are linearly represented by straight lines. The pressure increasing characteristic IP and the pressure decreasing characteristic DP are set from the deviations from the reference characteristic BP in the relationship of servo pressure S relative to the master pressure M.

In more concretely, the characteristics can be obtained, in which a mean deviation value $\beta$ between the reference characteristic BP and the first and second pressure increasing characteristics IP1 and IP2 is obtained and the pressure increasing characteristic IP is defined by adding the value $\beta$ to the reference characteristic BP. Then another mean deviation value $\alpha$ between the reference characteristic BP and the first and second pressure decreasing characteristics DP1 and DP2 is obtained and the pressure decreasing characteristic DP is defined by adding the value $\alpha$ to the reference characteristic BP. For example, by obtaining two points where the mean deviation value $\beta$ is respectively added to the two randomly selected points on the characteristic BP, the pressure increasing characteristic IP is obtained as a straight line characteristic. Similarly, by obtaining two points where the mean deviation value $\alpha$ is respectively added to the two randomly selected points on the characteristic BP, the pressure decreasing characteristic DP is obtained as a straight line characteristic. Thus, the total hydraulic pressure braking force of the brake device as a whole is the total of the braking force generated by the first master pressure and the braking force generated by the second master pressure. This can enable the accurate controlling of the hydraulic pressure braking force. The reference characteristic BP, pressure increasing characteristic IP and the pressure decreasing characteristic DP are memorized in the brake ECU 6 in the form of mathematic formula or map.

Figure 4:
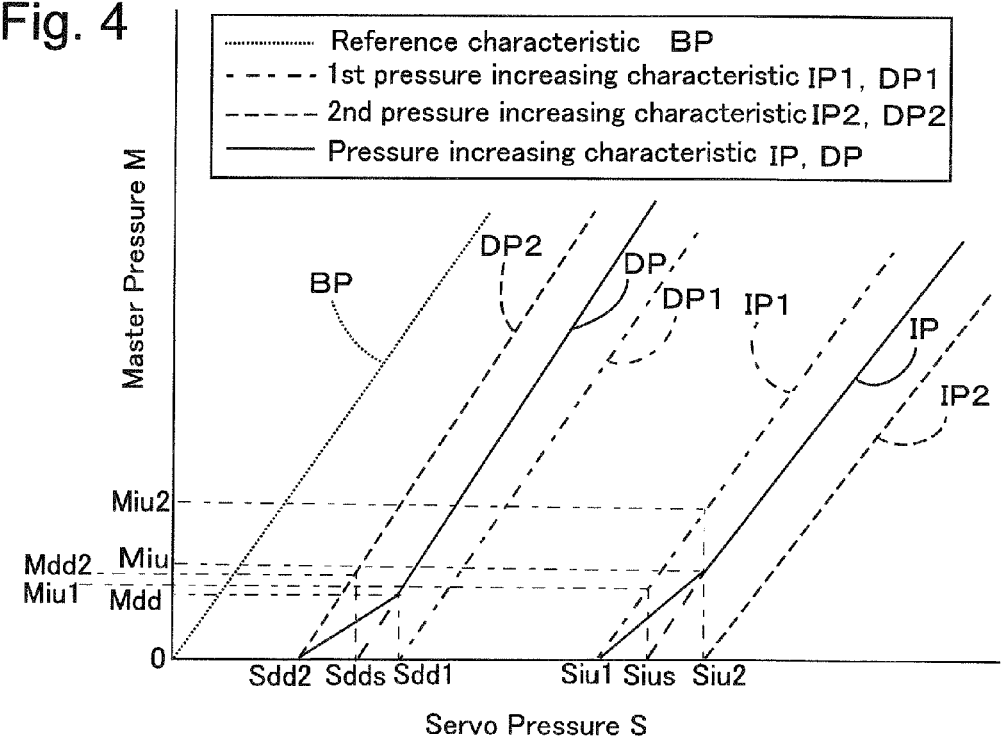
FIG. 4 is a graph illustrating a relationship between the servo pressure and the master pressure where the master pressure is in a low pressure area in FIG. 3.

It is noted here, that in FIG. 4, when the servo pressure S is increased to the value Sius, in the pressure increasing characteristic IP, in spite of the master pressure M being zero (0), the first master pressure Miu1 is generated in the first pressure increasing characteristic IP1. Further, when the servo pressure S is increased to the value of Siu2, the value of the master pressure should be the value Miu in the pressure increasing characteristic IP, but the second master pressure indicates zero (0) in the second pressure increasing characteristic IP2 and the first master pressure Miu2, which is larger than the master pressure Miu, is generated in the first pressure characteristic IP1. Accordingly, in the area that the servo pressure S is equal to or less than the value Siu2, the increasing inclination of the braking force relative to the servo pressure S is changed.

On the other hand, when the servo pressure S is decreased to the value Sdd1, in the first pressure decreasing characteristic DP1, since the first master pressure becomes zero (0), the first master pressure would not drop even if the servo pressure S is decreased to the value less than the value Sdd1. Accordingly, in the area where the servo pressure S is equal to or less than the value Sdd1, the decreasing inclination for the braking force relative to the servo pressure S changes. When the servo pressure S is further decreased to the value Sdds, the second master pressure Mdd2 in the second pressure decreasing characteristic DP2 remains, in spite of the master pressure M being zero in the pressure decreasing characteristic DP.

Therefore, the pressure increasing characteristic IP is set so that the servo pressure S in one of the first and the second pressure increasing characteristics IP1 and IP2, in which the servo pressure S thereof is smaller than the other, is gradually increased to the mean value $\beta$ in response to the increase of the master pressure M within the area that the master pressure is close to zero. The pressure decreasing characteristic DP is set so that when the master pressure M is approaching to zero, the servo pressure S in one of the first and the second pressure decreasing characteristics DP1 and DP2, in which the servo pressure S thereof is smaller than the other, is gradually decreased from the mean value $\alpha$ in response to the decrease of the master pressure M.

In other words, it is assumed that in the first pressure increasing characteristic and the second pressure increasing characteristic, one that includes a point at which the master pressure becomes larger than zero (0) from zero (0) with a smaller servo pressure than the servo pressure of the other of the first and the second pressure increasing characteristics IP1 and IP2 is defined to be a lower side pressure increasing characteristic IP1 and the servo pressure S at the point at which the master pressure M becomes larger than zero (0) from zero (0) in the lower side pressure increasing characteristic IP1 is defined to be a lower side pressure increasing starting servo pressure Siu1. Further, it is assumed that the other of the first and the second pressure increasing characteristics IP1 and IP2 that includes a point at which the master pressure becomes larger than zero (0) from zero (0) with a larger servo pressure than the servo pressure of the lower side pressure increasing characteristic IP1 is defined to be a higher side pressure increasing characteristic IP2 and the servo pressure S at the point at which the master pressure M becomes larger than zero (0) from zero (0) in the higher side pressure increasing characteristic IP1 is defined to be a higher side pressure increasing starting servo pressure Siu2. The pressure increasing characteristic IP at this state is set according to a predetermined pressure increasing characteristic calculation method, based on both of the first and the second pressure increasing characteristics IP1 and IP2 when the servo pressure in an increasing side high pressure area where the servo pressure S is equal to or more than the higher side pressure increasing starting servo pressure Siu2.

The master pressure M where the servo pressure S obtained by the pressure increasing characteristic IP in the increasing side high pressure area is assumed to be the higher side pressure increasing starting servo pressure Siu2, is defined to be a both side pressure increasing starting master pressure Miu and the pressure increasing characteristic is set to be a performance line connecting a point that the servo pressure S is the low side pressure increasing starting servo pressure Siu1 and the master pressure M is zero (0) and a point that the servo pressure is the high pressure increasing starting servo pressure Siu2 and the master pressure M is the both side pressure increasing starting master pressure Miu when the servo pressure is in the increasing side low pressure area in which the servo pressure S is less than the high pressure increasing starting servo pressure Siu2 and equal to or more than the low side pressure increasing starting servo pressure Siu1.

Further, it is assumed that that in one of the first pressure decreasing characteristic DP1 and the second pressure decreasing characteristic DP2, one that includes a point at which the master pressure M becomes larger than zero (0) from zero (0) with a smaller servo pressure S than the servo pressure S of the other of the first and the second pressure decreasing characteristics DP1 and DP2 is defined to be a lower side pressure decreasing characteristic DP2 and the servo pressure S at the point at which the master pressure M becomes larger than zero (0) from zero (0) in the lower side pressure decreasing characteristic DP2 is defined to be a lower side pressure decreasing finishing servo pressure Sdd2. It is further assumed that the other pressure decreasing characteristic DP2 that includes a point at which the master pressure M becomes larger than zero (0) from zero (0) with a larger servo pressure S than the servo pressure of the lower side pressure decreasing characteristic DP2 is defined to be a higher side pressure decreasing characteristic DP1 and the servo pressure S at the point at which the master pressure M becomes larger than zero (0) from zero (0) in the higher side pressure decreasing characteristic DP1 is defined to be a higher side pressure decreasing finishing servo pressure Sdd1. The pressure decreasing characteristic DP at this state is set according to a predetermined pressure decreasing characteristic calculation method, based on both of the first and the second pressure decreasing characteristics DP1 and DP2 when the servo pressure S in a decreasing side high pressure area where the servo pressure is equal to or more than the higher side pressure decreasing finishing servo pressure Sdd1.

It is assumed that the master pressure M where the servo pressure obtained by the pressure decreasing characteristic DP in the decreasing side high pressure area is the higher side pressure decreasing finishing servo pressure Sdd1 is defined to be a both side pressure decreasing finishing master pressure Mdd and further the pressure decreasing characteristic DP is set to be a performance line connecting a point that the servo pressure is the low side pressure decreasing finishing servo pressure Sdd2 and the master pressure M is zero (0) and a point that the servo pressure S is the high pressure decreasing finishing servo pressure Sdd1 and the master pressure M is the both side pressure decreasing finishing master pressure Mdd when the servo pressure S is in the decreasing side low pressure area in which the servo pressure S is less than the high pressure decreasing finishing servo pressure Sdd1 and equal to or more than the low side pressure decreasing finishing servo pressures Sdd2.

For example, in the pressure increasing characteristic IP, a straight line or a curve line connecting a point (Siu1, 0) and a point (Siu2, Miu) in the low pressure area of the servo pressure S from the value Siu1 to the value Siu2 (from value zero (0) to value Miu for master pressure M) is set. Also, in the pressure decreasing characteristic DP, a straight line or a curve line connecting a point (Sdd1, Mdd) and a point (Sdd2, 0) in the low pressure area of the servo pressure S from the value Sdd1 to the value Sdd2 (from value Mdd to zero (0) for master pressure M) is set. By thus setting the lines, the changes of increasing inclination and decreasing inclination of the master pressure in the low pressure area can be minimized. Further, the remaining pressure in the pressure decreasing operation can be eliminated to further accurately control the hydraulic pressure braking force of the vehicle braking device.

Figure 5:
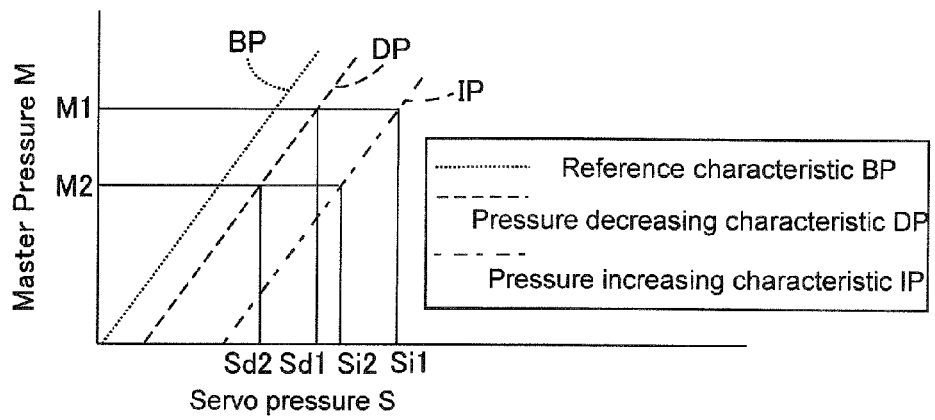
FIG. 5 is a graph illustrating a relationship between the servo pressure and the master pressure explaining the controlling of the master pressure of the embodiment of the invention.
Figure 6:
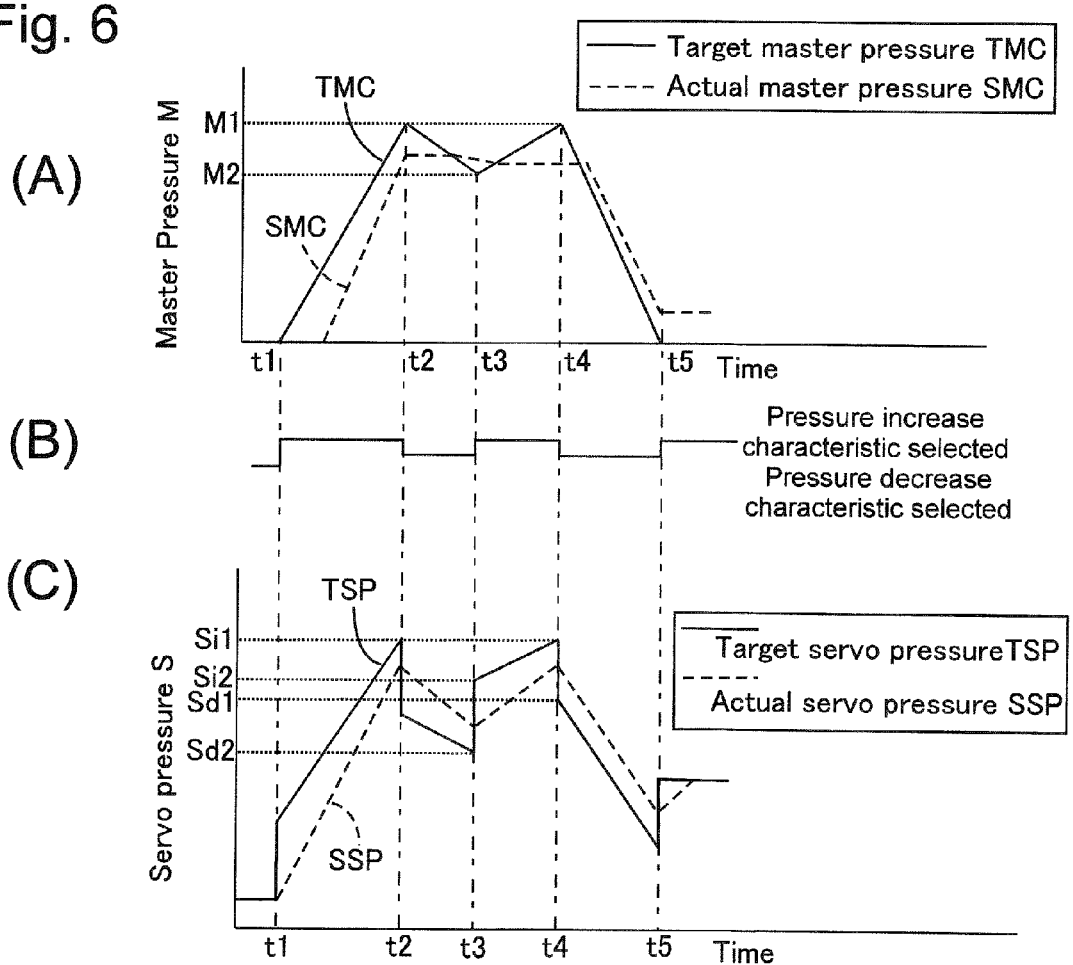
FIG. 6A is a diagram explaining a change over time of the master pressure.
FIG. 6B is a diagram showing the change of characteristics between the pressure increasing and decreasing according to the embodiment of the invention.
FIG. 6C is a diagram explaining a change over time of the servo pressure.
Figure 7:
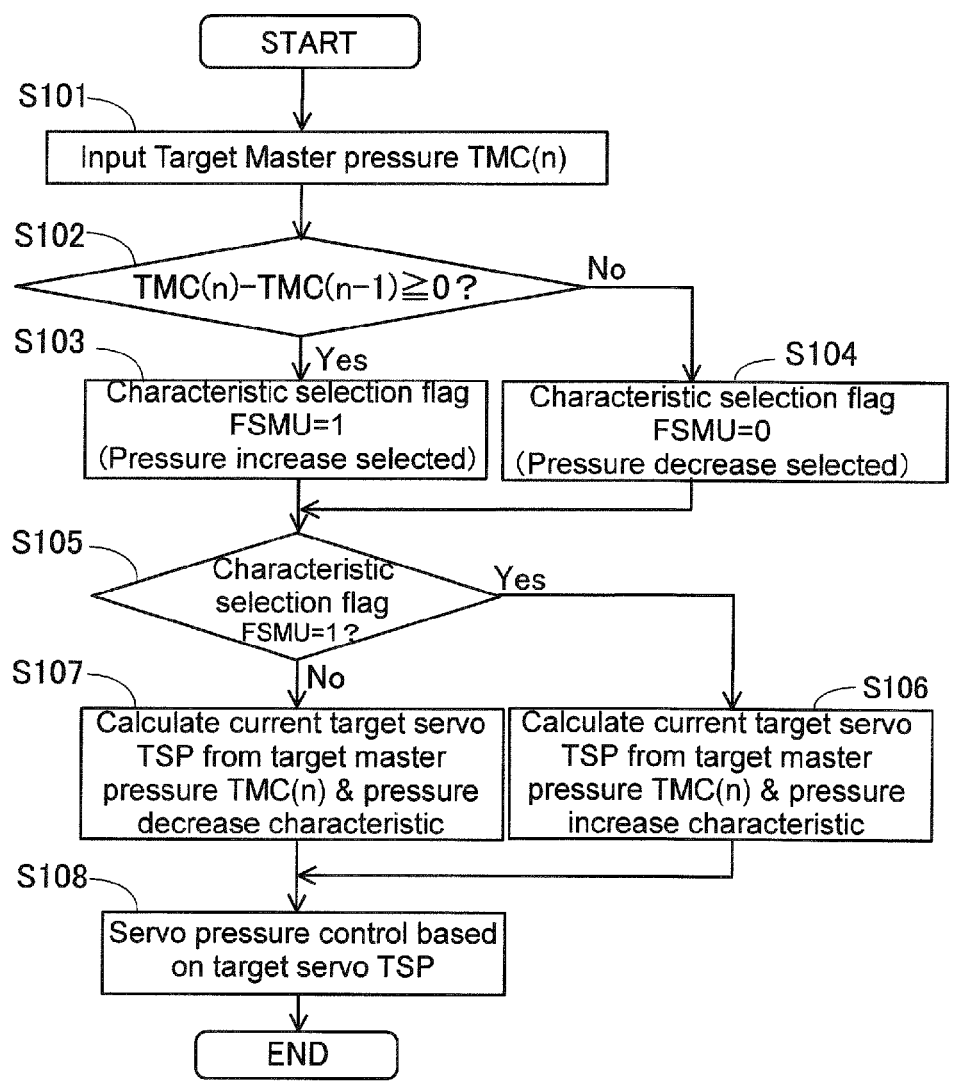
FIG. 7 is a flowchart explaining the controlling process of the master pressure according to the embodiment of the invention.

The master pressure M control operation by brake ECU 6, using the pressure increasing characteristic IP and the pressure decreasing characteristic DP will be explained hereinafter with reference to FIGS. 5 through 7. In FIG. 5, it is assumed that the servo pressures S of respective pressure increasing characteristic IP and the pressure decreasing characteristic DP corresponding to the master pressure being M1 are Si1 and Sd1 and that the servo pressures S of respective pressure increasing characteristic IP and the pressure decreasing characteristic DP corresponding to the master pressure being M2 are Si2 and Sd2. Then, as shown in FIG. 6A, the target master pressure TMC (solid line in FIG. 6A) is changed over time from 0 to M1 to M2 to M1 to 0.

First, it is assumed that the target master pressure TMC is increased from zero to M1 between the time t1 and time t2. Then, as shown in FIG. 7, the target master pressure TMC(n) is obtained based on one of or both of the stroke amount detected by the stroke sensor 72 and the reaction force detected by the pressure sensor 73 and inputted (S101, FIG. 6A). Then, it is judged whether or not the value TMC (n) currently obtained and inputted is equal to or more than the previously obtained and inputted value TMC (n−1) at the step S102. In this assumed example, since the currently inputted value is equal to or more than the previously inputted value TMC(n−1), as the pressure increasing characteristic selection flag, FSMU=1 (Pressure increasing) is on and memorized (step S103, FIG. 6B). At the step S105, it is judged whether the flag FSMU=1 (Pressure increasing) is on or not. However, since this example, the flag FSMU=1 (Pressure increasing) is on, the current target servo pressure TSP is obtained based on the current target master pressure TMC (n) and the pressure increasing characteristic IP (S106, FIG. 6C) and based on the current target servo pressure TSP, the servo pressure generating device 4 is controlled (S108) and the program ends.

Next, it is assumed that the target master pressure TMC is decreased from M1 to M2 between the time t2 and time t3. Then, as shown in FIG. 7, the target master pressure TMC(n) is obtained based on one of or both of the stroke amount detected by the stroke sensor 72 and the reaction force detected by the pressure sensor 73 and inputted (S101, FIG. 6A). Then, it is judged whether or not the value TMC (n) currently obtained and inputted is equal to or more than the previously obtained and inputted value TMC (n−1) at the step S102. In this assumed example, since the currently inputted value is less than the previously inputted value TMC (n−1), as the pressure increasing characteristic selection flag, FSMU=0 (Pressure decreasing selection) is on and memorized (step S104, FIG. 6B). At the step S105, it is judged whether the flag FSMU=1 (Pressure increasing) is on or not. However, since this example, the flag is not "FSMU=1" (Pressure increasing), but FSMU=0 (pressure decreasing selection) is on, the current target servo pressure TSP is obtained based on the current target master pressure TMC (n) and the pressure decreasing characteristic DP (S107, FIG. 6C) and based on the current target servo pressure TSP, the servo pressure generating device 4 is controlled (S108) and the program ends.

Thereafter, when the target master pressure TMC is changed over the time from the value M2 to the value M1 between the time t3 and the time t4 and when the target master pressure TMC is changed over the time from the value M1 to the value zero (0) between the time t4 and the time t5, similar control is performed. By this control, for example, since the target master pressure TMC is increased from the value zero according to the pressure increasing characteristic IP until the target master pressure TMC being changed to the value M1 at the time t2 when the characteristic is changed to the pressure decreasing characteristic DP, the target servo pressure TSP is decreased from the value Si1 to the value Sd1. Further, since the target master pressure TMC is decreased from the value M1 according to the pressure decreasing characteristic DP until the target master pressure TMC being changed to the value M2, at the time t3, when the characteristic is changed to the pressure increasing characteristic IP, the target servo pressure TSP is increased from the value Sd2 to the value Si2.

It is noted that, generally, the servo pressure under an actual use (actual servo pressure) SSP has some delay in generation relative to the target servo pressure TSP as is shown in the broken line in FIG. 6C. Particularly, when the target servo pressure TSP is largely changed upon changing of the characteristics at the time t2, t3 and t4, the delay of the generation of the actual servo pressure SSP becomes large. The master pressure in actual use (actual master pressure) SMC presumed from the actual servo pressure SSP may become, as shown by the broken line in FIG. 6A, a state that substantially no pressure change occurs from the time t2 to the time t4 or a remaining pressure is generated at the time t3. Accordingly, when the braking force is applied dynamically, such as upon a sudden brake operation, this control is not appropriate. This control is applicable to a case where a gentle or normal brake operation is performed (in the case of static brake operation).

Figure 8:
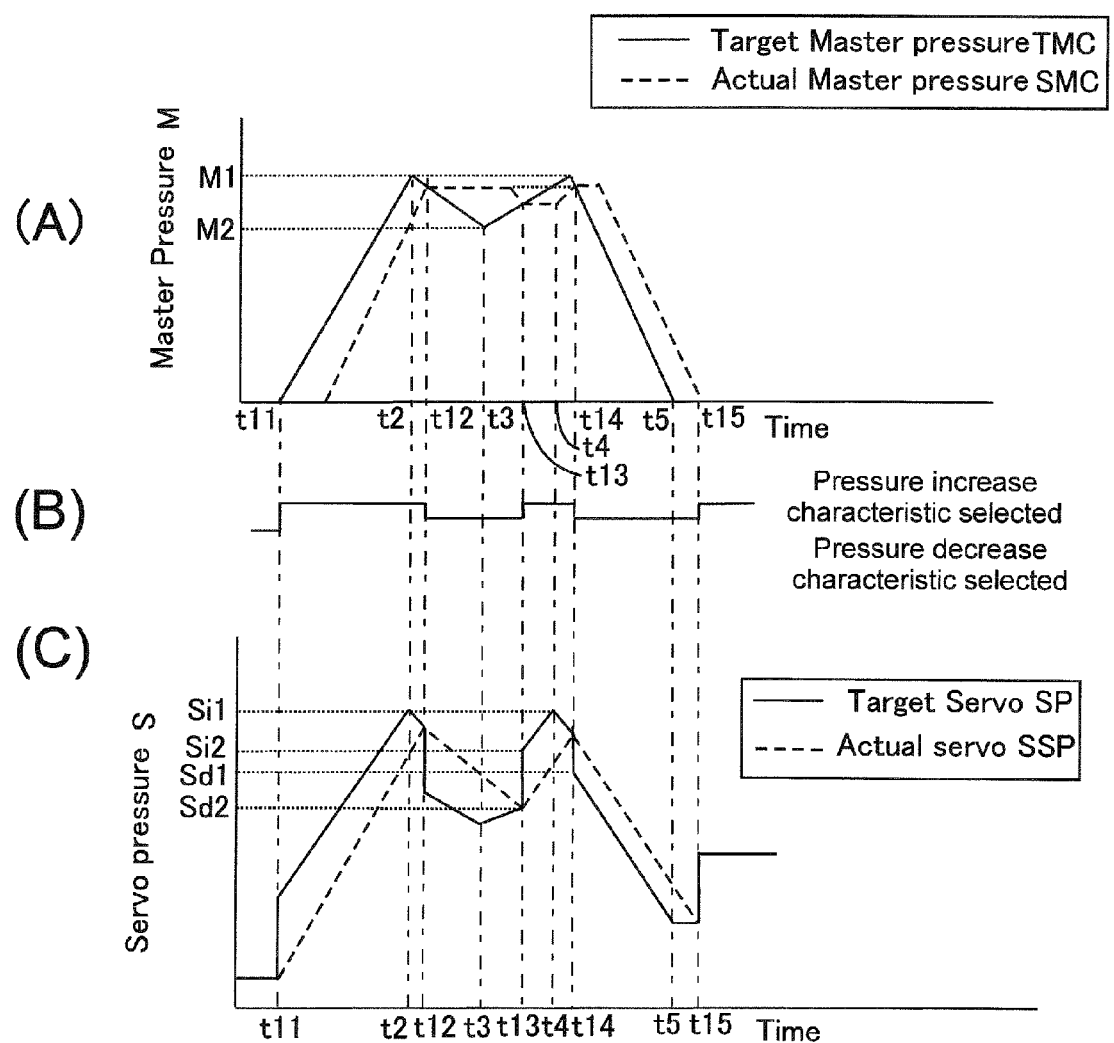
FIG. 8A is a diagram of another example explaining a change over time of the master pressure.
FIG. 8B is a diagram of another example howing the change of characteristics between the pressure increasing and decreasing according to the embodiment of the invention.
FIG. 8C is a diagram of another example explaining a change over time of the servo pressure.
Figure 9:
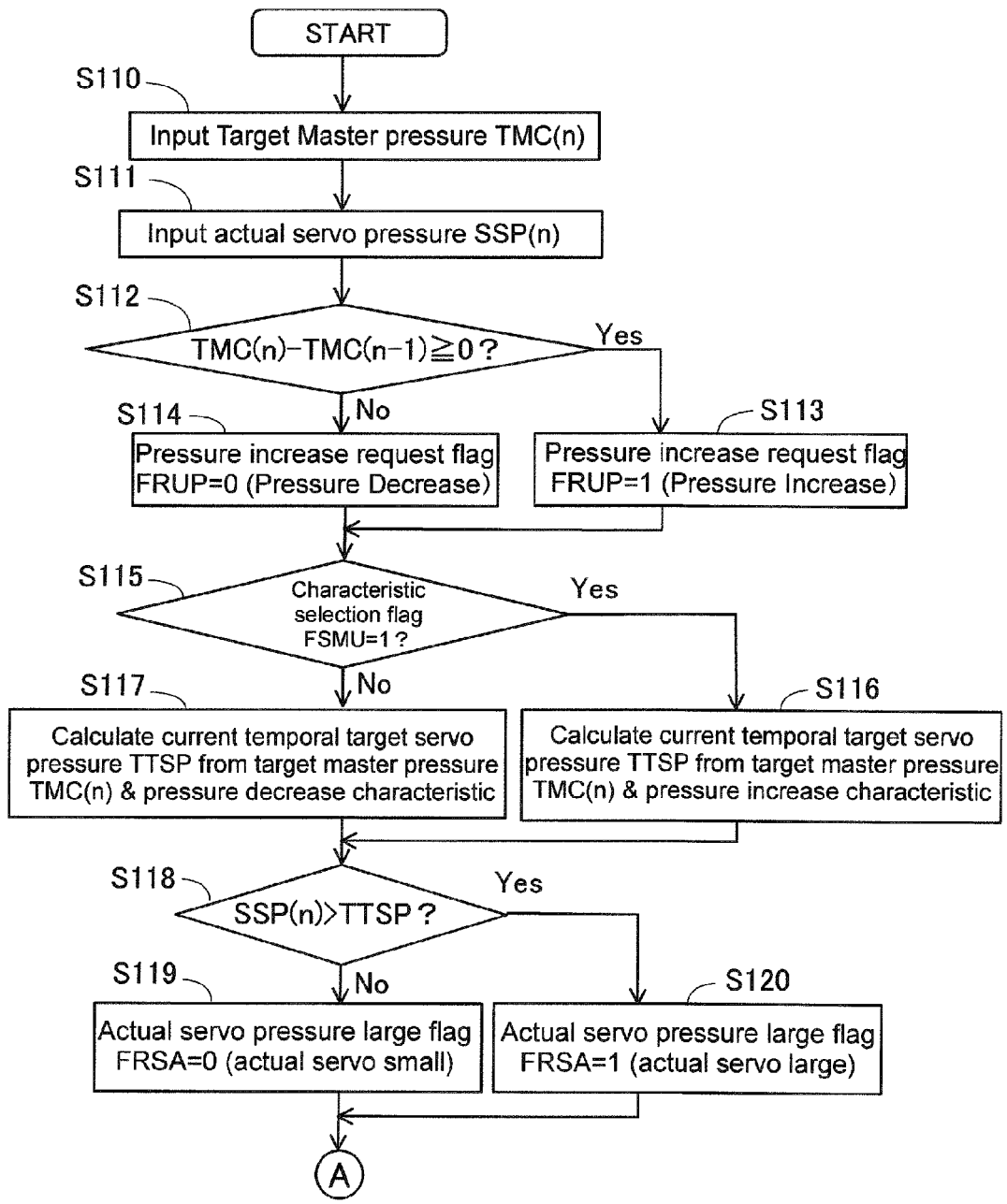
FIG. 9 is a first flowchart explaining the controlling process of another master pressure according to the embodiment of the invention.

The master pressure M control operation by brake ECU 6 under a dynamic brake operation, using the pressure increasing characteristic IP and the pressure decreasing characteristic DP will be explained hereinafter with reference to FIGS. 8 through 10. In similar to a static brake operation, it is assumed that the servo pressures S of respective pressure increasing characteristic IP and the pressure decreasing characteristic DP corresponding to the master pressure being M1 are Si1 and Sd1 and that the servo pressures S of respective pressure increasing characteristic IP and the pressure decreasing characteristic DP corresponding to the master pressure being M2 are Si2 and Sd2 (See FIG. 5). Then, as shown in FIG. 8A, the target master pressure TMC (solid line in FIG. 8A) is changed over time from 0 to M1 to M2 to M1 to 0.

First, it is assumed that the target master pressure TMC is increased from zero to M1 between the time t1 and time t2. Then, as shown in FIG. 9, the target master pressure TMC(n) is obtained based on one of or both of the stroke amount detected by the stroke sensor 72 and the reaction force detected by the pressure sensor 73 and inputted (S110, FIG. 8A). Further, the actual servo pressure SSP (n) detected by the pressure sensor 74 is inputted (S111).

Then it is judged whether or not the target master pressure TMC (n) currently obtained and inputted is equal to or more than the previously obtained and inputted value TMC (n−1) at the step S112. In this assumed example, since the currently inputted value is equal to or more than the previously inputted value TMC(n−1), as the pressure increasing requesting flag, FRUP=1 (Pressure increasing) is on (S113). Then it is further judged whether or not the flag FSMU=1 (Pressure increasing) is on or not as the previously selected characteristic selecting flag (S115, FIG. 8B). However, since in this example, the flag FSMU=1 (Pressure increasing) is on, a current temporal target servo pressure TTSP is obtained based on the current target master pressure TMC(n) and the pressure increasing characteristic IP and it is further judged whether or not the actual servo pressure SSP (n) is greater than the target servo pressure TTSP (S116, FIG. 8C). In this example, since the actual servo pressure SSP (n) is equal to or less than the target servo pressure TTSP. Therefore, the flag FRSA=0 (actual servo; small) is on as the actual servo pressure great flag at the step S119.

Figure 10:
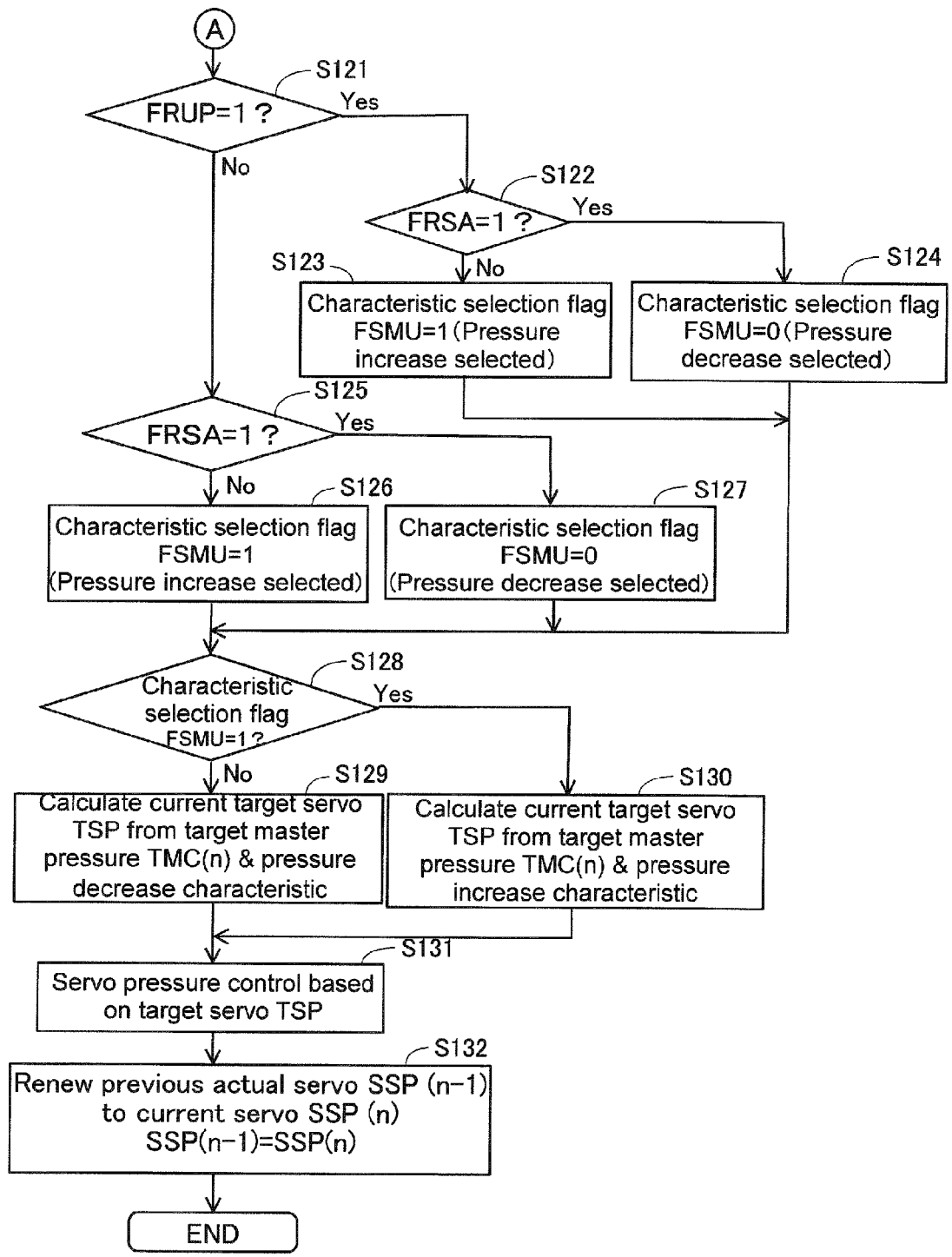
FIG. 10 is a second flowchart explaining the controlling process of another master pressure according to the embodiment of the invention.

As shown in FIG. 10, it is judged whether the flag "FRUP=1 (pressure increasing)" is on as the pressure increasing requesting flag (at the step S121). In this example, since the flag "FRUP=1 (pressure increasing)" is on as the pressure increasing requesting flag, it is further judged whether or not the flag FRSA=1 (actual servo; great) is on as the actual servo pressure great flag (at the step S122). In this example, since the flag on is not the flag "FRSA=1 (actual servo; great)" but the flag of "FRSA=0 (actual servo; small)" as the actual servo pressure great flag, the flag FSMU=1 (pressure increasing characteristic selection) is on and this flag is memorized (S123).

Then it is judged whether or not the flag FSMU=1 (pressure increasing characteristic selection) is on as the characteristic selecting flag (step S128). In this example, since the flag of FSMU=1 (pressure increasing characteristic selection) is on as the characteristic selecting flag, the current target servo pressure TSP is obtained based on the current target master pressure TMC (n) and the pressure increasing characteristic IP (See step S130, FIG. 8C). Then, based on the current target servo pressure TSP, the servo pressure generating device 4 is controlled (at the step S131) and the previous actual servo pressure SSP (n−1) is renewed to the current actual servo pressure SSP (n) (SSP (n−1)=SSP (n)) at the step S132 and the program ends.

First, it is assumed that the target master pressure TMC is decreased from M1 to M1 a between the time t2 and time t12. Then, as shown in FIG. 9, the target master pressure TMC(n) is obtained based on one of or both of the stroke amount detected by the stroke sensor 72 and the reaction force detected by the pressure sensor 73 and inputted (S110, FIG. 8A). Then, the actual servo pressure SSP detected by the pressure sensor 74 is inputted (step S111).

Then, it is judged whether or not the target master pressure TMC(n) currently obtained and inputted is equal to or more than the previously obtained and inputted value TMC(n−1) at the step S112. In this assumed example, since the currently inputted target master pressure TMC (n) is less than the previously inputted value TMC(n−1), as the pressure increasing requesting flag, FRUP=0 (Pressure decreasing) is on and memorized (step S114). It is then judged whether or not the flag FSMU=1 (Pressure increasing) is on or not as the previously selected characteristic selecting flag (See S115, FIG. 8B). However, sin this situation, as the performance selecting flag, the flag FSMU=1 (pressure increasing) is not on, but the FSMU=0 (pressure decreasing) is on. Therefore, the current temporal target servo pressure TTSP is obtained from the current target master pressure TMC (n) and the pressure decreasing characteristic DP (See s117, FIG. 8C). Then further it is judged whether or not the actual servo pressure SSP (n) is greater than the target servo pressure TTSP. In this example, since the actual servo pressure SSP (n) is equal to or less than the target servo pressure TTSP, the flag of "FRSA=0 (actual servo; small) is on as the actual servo pressure great flag and is memorized (S119).

As shown in FIG. 10, it is judged whether the flag "FRUP=1 (pressure increasing)" is on as the pressure increasing requesting flag (at the step S121). In this example, since the flag "FRUP=0 (pressure decreasing)" is on as the pressure decreasing requesting flag, it is further judged whether or not the flag FRSA=1 (actual servo; great) is on as the actual servo pressure great flag (at the step S125). In this example, since the flag on is the flag of "FRSA=0 (actual servo; small)", as the characteristic selecting flag, the flag FSMU=1 (pressure increasing characteristic selection) is on and this flag is memorized (S126).

Then it is judged whether or not the flag FSMU=1 (pressure increasing characteristic selection) is on as the characteristic selecting flag (step S128). In this example, since the flag of FSMU=1 (pressure increasing characteristic selection) is on as the characteristic selecting flag, the current target servo pressure TSP is obtained based on the current target master pressure TMC (n) and the pressure increasing characteristic IP (See step S130, FIG. 8C). Then, based on the current target servo pressure TSP, the servo pressure generating device 4 is controlled (at the step S131) and the previous actual servo pressure SSP (n−1) is renewed to the current actual servo pressure SSP (n) (SSP (n−1)=SSP (n)) at the step S132 and the program ends.

According to the control shown in FIG. 6, the pressure increasing characteristic IP is immediately changed to the pressure decreasing characteristic DP as soon as the target master pressure TMC is decreased. However, according to the control shown in FIG. 8, the pressure increasing characteristic IP is kept used even the target master pressure TMC is decreased when the actual servo pressure SSP is equal to or less than the target servo pressure TTSP. Thus, as shown in FIG. 8C, the actual servo pressure SSP is increased from the time t2 to the time t12 to agree to the target servo pressure TTSP. At the time point t12 in FIG. 8C, when the actual servo pressure SSP agrees to the target servo pressure TTSP, the pressure increasing characteristic IP is immediately changed to the pressure decreasing characteristic DP.

It is noted that in this example, the actual servo pressure SSP has some delay in generation relative to the target servo pressure TSP as is shown in the broken line in FIG. 8C. The actual master pressure SMC presumed from the actual servo pressure SSP may change, as shown by the broken line in FIG. 8A, the pressure from the time t12 to the time t13. At the same time the occurrence of the remaining pressure can be prevented to improve the responsibility of the brake operation by the brake device.

Thereafter, when the target master pressure TMC is increased from the value M2 to the value M1 between the time t3 and the time t4 and when the target master pressure TMC is decreased from the value M1 to the value zero (0) between the time t4 and the time t5, similar control is performed. In other words, when the actual servo pressure SSP and the target servo pressure TSP agree to each other at the time t13 in FIG. 8C, the pressure decreasing characteristic DP is immediately changed to the pressure increasing characteristic IP. As shown in FIG. 8C, when the actual servo pressure SSP and the target servo pressure TSP agree to each other at the time t14 in FIG. 8C, the pressure increasing characteristic IP is immediately changed to the pressure decreasing characteristic DP. As clearly shown in FIG. 8, the timing that the actual servo pressure catches up the target servo pressure during the pressure increasing characteristic being selected to change the magnitude relationship between the target servo pressure and the actual servo pressure is also the timing that actual master pressure catches up the target master pressure to change the magnitude relationship between the target master pressure and the actual master pressure. Further, the timing that the actual servo pressure catches up the target servo pressure during the pressure decreasing characteristic being selected to change the magnitude relationship between the target servo pressure and the actual servo pressure is also the timing that actual master pressure catches up the target master pressure to change the magnitude relationship between the target master pressure and the actual master pressure. Accordingly, instead of using the target servo pressure and the actual servo pressure, by using the target master pressure and the actual master pressure, the characteristic can be changed between the pressure increasing characteristic pressure and the pressure decreasing characteristic.

According to the embodiment of the invention, the pressure increasing characteristic IP is set based on the first pressure increasing characteristic IP1 obtained from the relationship between the servo pressure S and the first master pressure M upon increasing the master pressure M and the second pressure increasing characteristic IP2 obtained from the relationship between the servo pressure S and the second master pressure M. Further, the pressure decreasing characteristic DP is set based on the first pressure decreasing characteristic DP1 obtained from the relationship between the servo pressure S and the first master pressure M upon decreasing the master pressure M and the second pressure decreasing characteristic DP2 obtained from the relationship between the servo pressure S and the second master pressure M. Accordingly, the total hydraulic pressure braking force of the brake device as a whole is the total of the braking force generated by the first master pressure and the braking force generated by the second master pressure. This can enable the accurate controlling of the hydraulic pressure braking force.

The pressure increasing characteristic IP and the pressure decreasing characteristic DP are respectively set as the mean values of the first and the second pressure increasing characteristics IP1 and IP2 and the first and the second pressure decreasing characteristics DP1 and DP2. Thus the difference in characteristics between the first master pressure M and the second master pressure M can be compensated to more accurately control the braking force of the entire brake device. Further, the pressure increasing characteristic IP and the pressure decreasing characteristic DP are set to values which are different from the mean values in the area of the low master pressure M. This can minimize the increasing inclination and the decreasing inclination of the master pressure M in the low pressure area and further the remaining pressure generated in the pressure decreasing operation can be eliminated thereby to more accurately control the braking force of the entire brake device. Further, by only obtaining one single reference characteristic BP which indicates the relationship between the servo pressure S and the master pressure M when no hysteresis is generated on the first and second master pistons 14 and 15 upon slidable movement, the first pressure increasing characteristic IP1 may be easily obtained as the deviation from the master pressure M relative to the servo pressure S in the reference characteristic BP and at the same time, the pressure increasing characteristic IP and the pressure decreasing characteristic DP are easily obtained as the deviation from the master pressure M relative to the servo pressure S in the reference characteristic BP.

It is noted that when the actual servo pressure SSP exceeds the target servo pressure TSP due to a noise or the like during the pressure increasing operation, the brake ECU 6 selects the pressure decreasing characteristic DP and the brake ECU 6 does not increase the actual servo pressure SSP until the target servo pressure TSP catches up the actual servo pressure SSP, which may generate a phenomenon that the master pressure M does not increase due to the non-increase of the actual servo pressure SSP. In such a case, a filtered value is used for the actual servo pressure SSP, or a dead zone (hysteresis) is provided for a judgment of up and down of the target servo pressure TSP and the actual servo pressure SSP to prevent such occurrence of the phenomenon. Further, according to the embodiment, in case of normal braking operation where the braking force is applied to the vehicle based on the brake operation of the operator of the vehicle in the linear mode operation, the target braking force is calculated based on the brake operation amount by the operator and based on the target braking force and the regeneration braking force, the target hydraulic pressure braking force can be calculated. Then from the calculated target hydraulic pressure braking force, the target master pressure is calculated to finally calculate the target servo pressure from the calculated target master pressure. In other words, in case of using the regeneration braking force, it is possible to use a similar index because there exists a correlative relationship between the brake operation amount and the target braking force. Therefore, it is possible to use the similar index using the correlative relationship between the hydraulic pressure braking force and the master pressure. On the other hand, if in the case of a vehicle having no regeneration brake device or in the case of a vehicle having regeneration brake device but no regeneration braking force is generated due to some reasons, the value of regeneration force becomes zero and accordingly, the target braking force and the target hydraulic pressure braking force are equal to each other under normal braking operation. Accordingly, similar index can be used due to the correlative relationship among the brake operation amount, target braking force, target hydraulic pressure braking force and target master pressure in case no regeneration braking force is generated. Since the braking force has a correlative relationship with the vehicle deceleration generated as the result of application of braking force, the braking force and the vehicle deceleration are correlatively related and similarly these can be used as an index.

The invention claimed is:

1. A brake device for a vehicle, comprising:
a master cylinder;
a master piston slidably and liquid-tightly disposed in the master cylinder and forming a master chamber with the master cylinder for supplying a plurality of wheel cylinders with a master pressure;
a servo chamber formed between the master piston and an intermittent wall of the master cylinder;
a servo pressure generating means for generating a servo pressure to be supplied to the servo chamber and biasing the master piston in forward direction for generating the master pressure in the master chamber;
a brake operation means operated by an operator of the vehicle;
a target master pressure setting means for setting a target master pressure based on an operation amount of the brake operation means;
a pressure increasing characteristic memorized based on a relationship between the servo pressure and the master pressure when the master pressure is increasing;
a pressure decreasing characteristic memorized based on the relationship between the servo pressure and the master pressure when the master pressure is decreasing; and,
a target servo pressure setting means for setting a target servo pressure in response to the target master pressure by selecting the pressure increasing characteristic or the pressure decreasing characteristic depending on a state of the master pressure either in a pressure increasing state or in a pressure decreasing state, wherein the master piston includes a second master piston forming a second master chamber in the master cylinder defined by a front bottom portion of the master cylinder and the second master piston to supply a second wheel cylinder among the plurality of wheel cylinders with a second master pressure and a first master piston forming a first master chamber in the master cylinder defined by the second master piston and the first master piston to supply a first wheel cylinder among the plurality of wheel cylinders with a first master pressure, wherein the servo chamber is formed between a rear surface of the first master piston and the intermittent wall of the master cylinder, wherein the pressure increasing characteristic is set based on a first pressure increasing characteristic obtained based on a relationship between the servo pressure and the first master pressure and a second pressure increasing characteristic obtained based on a relationship between the servo pressure and the second master pressure when the servo pressure is increasing, and wherein the pressure decreasing characteristic is set based on a first pressure decreasing characteristic obtained based on the relationship between the servo pressure and the first master pressure and a second pressure decreasing characteristic obtained based on the relationship between the servo pressure and the second master pressure when the servo pressure is decreasing.

2. The brake device for the vehicle according to claim 1, wherein the pressure increasing characteristic is obtained by a mean value between the first pressure increasing characteristic and the second pressure increasing characteristic and the pressure decreasing characteristic is obtained by a mean value between the first pressure decreasing characteristic and the second pressure decreasing characteristic.

3. The brake device for the vehicle according to claim 1, wherein a reference characteristic, which indicates a relationship between the servo pressure and the master pressure, assuming that a hysteresis does not exist in a slidable movement of the master piston relative to the master cylinder, is memorized, and wherein the first pressure increasing characteristic, the second pressure increasing characteristic, the first pressure decreasing characteristic and the second pressure decreasing characteristic are respectively set to be deviations from the reference characteristic of the servo pressure relative to the master pressure, while the pressure increasing characteristic and the pressure decreasing characteristic are respectively set to be deviations from the reference characteristic of the servo pressure relative to the master pressure.

4. The brake device for the vehicle according to claim 1, assuming that in one of the first pressure increasing characteristic and the second pressure increasing characteristic, one that includes a point at which the master pressure becomes larger than zero (0) from zero (0) with a smaller servo pressure than the servo pressure of the other of the first and the second pressure increasing characteristics is defined to be a lower side pressure increasing characteristic and the servo pressure at the point at which the master pressure becomes larger than zero (0) from zero (0) in the lower side pressure increasing characteristic is defined to be a lower side pressure increasing starting servo pressure, and assuming that the other of the first and the second pressure increasing characteristics that includes a point at which the master pressure becomes larger than zero (0) from zero (0) with a larger servo pressure than the servo pressure of the lower side pressure increasing characteristic is defined to be a higher side pressure increasing characteristic and the servo pressure at the point at which the master pressure becomes larger than zero (0) from zero (0) in the higher side pressure increasing characteristic is defined to be a higher side pressure increasing starting servo pressure;

the pressure increasing characteristic is set according to a predetermined pressure increasing characteristic calculation method based on both of the first and the second pressure increasing characteristics when the servo pressure in an increasing side high pressure area where the servo pressure is equal to or more than the higher side pressure increasing starting servo pressure;

the master pressure, where the servo pressure obtained by the pressure increasing characteristic in the increasing side high pressure area is the higher side pressure increasing starting servo pressure, is defined to be a both side pressure increasing starting master pressure;

the pressure increasing characteristic is set to be a characteristic line connecting a point that the servo pressure is the lower side pressure increasing starting servo pressure and the master pressure is zero (0) and a point that the servo pressure is the higher side pressure increasing starting servo pressure and the master pressure is the both side pressure increasing starting master pressure when the servo pressure is in an increasing side low pressure area in which the servo pressure is less than the higher side pressure increasing starting servo pressure and equal to or more than the lower side pressure increasing starting servo pressure and wherein, assuming that in one of the first pressure decreasing characteristic and the second pressure decreasing characteristic, one that includes a point at which the master pressure becomes larger than zero (0) from zero (0) with a smaller servo pressure than the servo pressure of the other of the first and the second pressure decreasing characteristics, is defined to be a lower side pressure decreasing characteristic and the servo pressure at the point at which the master pressure becomes larger than zero (0) from zero (0) in the lower side pressure decreasing characteristic is defined to be a lower side pressure decreasing finishing servo pressure and, assuming that the pressure decreasing characteristic that includes a point at which the master pressure becomes larger than zero (0) from zero (0) with a larger servo pressure than the servo pressure of the lower side pressure decreasing characteristic is defined to be a higher side pressure decreasing characteristic and the servo pressure at the point at which the master pressure becomes larger than zero (0) from zero (0) in the higher side pressure decreasing characteristic is defined to be a higher side pressure decreasing finishing servo pressure;

the pressure decreasing characteristic is set according to a predetermined pressure decreasing characteristic calculation method, based on both of the first and the second pressure decreasing characteristics when the servo pressure in a decreasing side high pressure area where the servo pressure is equal to or more than the higher side pressure decreasing finishing servo pressure;

the master pressure where the servo pressure obtained by the pressure decreasing characteristic in the decreasing side high pressure area is the higher side pressure decreasing finishing servo pressure is defined to be a both side pressure decreasing finishing master pressure; and the pressure decreasing characteristic is set to be a characteristic line connecting a point that the servo pressure is the lower side pressure decreasing finishing servo pressure and the master pressure is zero (0) and a point that the servo pressure is the higher side pressure decreasing finishing servo pressure and the master pressure is the both side pressure decreasing finishing master pressure when the servo pressure is in the decreasing side low pressure area in which the servo pressure is less than the higher side pressure decreasing finishing servo pressure and equal to or more than the lower side pressure decreasing finishing servo pressure.

5. The brake device for the vehicle according to claim 1, wherein the pressure increasing characteristic is selected when the operation amount by the brake operation means is increasing and the pressure decreasing characteristic is selected when the operation amount by the brake operation means is decreasing.

6. The brake device for the vehicle according to claim 1, wherein any of the target master pressure, a target braking force, a target hydraulic pressure braking force and a target vehicle deceleration is set to be a pressure increasing/decreasing characteristics selecting index and the pressure increasing characteristic is selected when the pressure increasing/decreasing characteristics selecting index is increasing and the pressure decreasing characteristic is selected when the pressure increasing/decreasing characteristics selecting index is decreasing.

7. The brake device for the vehicle according to claim 1, wherein the pressure decreasing characteristic is selected when an actual servo pressure which is actually generated is judged to have exceeded the target servo pressure while the pressure increasing characteristic is being selected and the pressure increasing characteristic is selected when the actual servo pressure which is actually generated is judged to have been below the target servo pressure while the pressure decreasing characteristic is being selected.

8. The brake device for the vehicle according to claim 1, wherein the pressure decreasing characteristic is selected when an actual master pressure which is actually generated is judged to have exceeded the target master pressure while the pressure increasing characteristic is being selected and the pressure increasing characteristic is selected when the target master pressure is judged to have been below the actual master pressure which is actually generated while the pressure decreasing characteristic is being selected.

9. The brake device for the vehicle according to claim 1, wherein the pressure decreasing characteristic is selected when an actual vehicle deceleration which is a vehicle deceleration in actual running of the vehicle is judged to have exceeded the target vehicle deceleration while the pressure increasing characteristic is being selected and the pressure increasing characteristic is selected when the actual vehicle deceleration which is the vehicle deceleration in actual miming of the vehicle is judged to have been below the target vehicle deceleration while the pressure decreasing characteristic is being selected.

* * * * *